United States Patent
Perry et al.

(10) Patent No.: US 11,918,894 B2
(45) Date of Patent: *Mar. 5, 2024

(54) SYSTEMS AND METHODS FOR TAGGING CONTENT OF SHARED CLOUD EXECUTED MINI-GAMES AND TAG SHARING CONTROLS

(71) Applicant: Sony Interactive Entertainment LLC, San Mateo, CA (US)

(72) Inventors: David Perry, Newport Beach, CA (US); Michael Taylor, San Mateo, CA (US); Warren Benedetto, Foothill Ranch, CA (US); Dominic S. Mallinson, Redwood City, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 697 days.

This patent is subject to a terminal disclaimer.

(21) Appl. No.: 16/385,351

(22) Filed: Apr. 16, 2019

(65) Prior Publication Data

US 2019/0240572 A1    Aug. 8, 2019

Related U.S. Application Data

(63) Continuation of application No. 13/779,730, filed on Feb. 27, 2013, now Pat. No. 10,258,881.

(Continued)

(51) Int. Cl.
*A63F 13/60* (2014.01)
*A63F 13/335* (2014.01)
(Continued)

(52) U.S. Cl.
CPC .......... *A63F 13/355* (2014.09); *A63F 13/493* (2014.09); *A63F 13/60* (2014.09);
(Continued)

(58) Field of Classification Search
CPC ....... A63F 13/60; A63F 13/355; A63F 13/493
(Continued)

(56) References Cited

U.S. PATENT DOCUMENTS

| | | |
|---|---|---|
| 6,699,127 B1 * | 3/2004 | Lobb ..................... A63F 13/807 463/43 |
| 10,258,881 B2 * | 4/2019 | Perry .................... A63F 13/493 |

(Continued)

*Primary Examiner* — David L Lewis
*Assistant Examiner* — Robert E Mosser
(74) *Attorney, Agent, or Firm* — PENILLA IP, APC

(57) ABSTRACT

Methods for tagging content in a video game title during game play executed on a game cloud system, and social sharing methods. One method includes receiving a pause indication during the game play and suspending the game play to hold the video game title in a current frame image, storing the game state, and receiving the tag data that is associated to a location in the current frame image and to a user identifier for the current frame image. The method further includes generating a video recording of the game play having the tag data and generating a mini-game from a portion of the video game title. The mini-game includes a playable portion to enable view of a portion of the video recording for the mini-game and an executable portion to enable the play of game code for the mini-game that is a portion of the video game title.

23 Claims, 18 Drawing Sheets

Related U.S. Application Data

(60) Provisional application No. 61/746,081, filed on Dec. 26, 2012.

(51) Int. Cl.
*A63F 13/355* (2014.01)
*A63F 13/493* (2014.01)
*A63F 13/69* (2014.01)
*A63F 13/86* (2014.01)

(52) U.S. Cl.
CPC ............ *A63F 13/86* (2014.09); *A63F 13/335* (2014.09); *A63F 13/69* (2014.09)

(58) Field of Classification Search
USPC .......................................................... 463/31
See application file for complete search history.

(56) References Cited

U.S. PATENT DOCUMENTS

| | | | | |
|---|---|---|---|---|
| 2005/0070349 A1* | 3/2005 | Kimura | ................... | A63F 13/53 463/4 |
| 2011/0107220 A1* | 5/2011 | Perlman | ................ | H04L 65/605 715/720 |
| 2011/0107369 A1* | 5/2011 | O'Brien | ................... | G06F 16/78 725/38 |
| 2011/0111854 A1* | 5/2011 | Roberts | ................... | A63F 13/87 463/39 |
| 2013/0260896 A1* | 10/2013 | Miura | .................... | A63F 13/47 463/42 |
| 2014/0094314 A1* | 4/2014 | Watson | ................... | A63F 13/70 463/42 |

\* cited by examiner

SYSTEMS AND METHODS FOR TAGGING CONTENT OF SHARED CLOUD EXECUTED MINI-GAMES AND TAG SHARING CONTROLS

CLAIM OF PRIORITY

This application claims the benefit of and priority to U.S. patent application Ser. No. 13/779,730, filed on Feb. 27, 2013; which claims the benefit of and priority to U.S. Provisional Patent Application No. 61/746,081, filed on Dec. 26, 2012, all of which are hereby incorporated by reference in their entireties.

BACKGROUND

1. Field of the Invention

The present invention relates to systems and methods for tagging content in a game, particularly a game shared in a game cloud executed system.

2. Description of the Related Art

Cloud systems, using computing resources (hardware and software), deliver services over a network (typically the Internet). The services, in the context of gaming, enable streaming of content to remote clients, wherein most processing is done on servers, which may be distributed. Input provided at the remote clients will in turn drive execution of the game, without the need for dedicated gaming hardware at the client's location. Cloud gaming, therefore, has been increasing in popularity because users find it easier to access more titles without complex hardware restrictions and game suppliers find it easier manage game code from centralized locations.

It is in this context that embodiments of the invention arise.

SUMMARY

Embodiments of the present invention relate to systems and methods for tagging content of shared cloud executed mini-games and tag sharing controls. Several inventive embodiments of the present invention are described below.

In one embodiment, a method for tagging content in a video game title during game play executed on a game cloud system is disclosed. The method includes executing the game play of the video game title while receiving user interactive input, and receiving a pause indication from the user interactive input. In response to the pause indication, the game play is suspended and the game state is stored. The suspending acts to hold the video game title in a current frame image. The method further includes receiving tag data for the current frame image. The tag data is associated to a location in the current frame image and a user identifier (UID). Then, the game play may be resumed. Additional tag data may be received by repeating the above mentioned operations. The disclosed method also includes generating a video recording of the game play having the tag data and generating a mini-game from a portion of the video game title by identifying start and end positions in the video recording. The mini-game includes a playable portion to enable view of a portion of the video recording for the mini-game, and an executable portion to enable play of game code for the mini-game that is a portion of the video game title.

In another embodiment, a system for enabling generation of mini-games executed on a cloud computing system is disclosed. The cloud computing system includes a mini-game processor and a tag processor. The mini-game processor is configured to generate a mini-game based on a portion of a video recording of game play for a video game title executed for a game player. The tag processor is configured to receive the tag content for the mini-game. The tag content is associated with the video frames of the video recording of the mini-game. The mini-game is sharable with other users of a social group that has access to view the video frames of the recording for the mini-game. The tag processor may handle the addition of the tag content from the users having access through the social group and associate the user identification to the tag content added to the mini-game.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

Figure 1A:
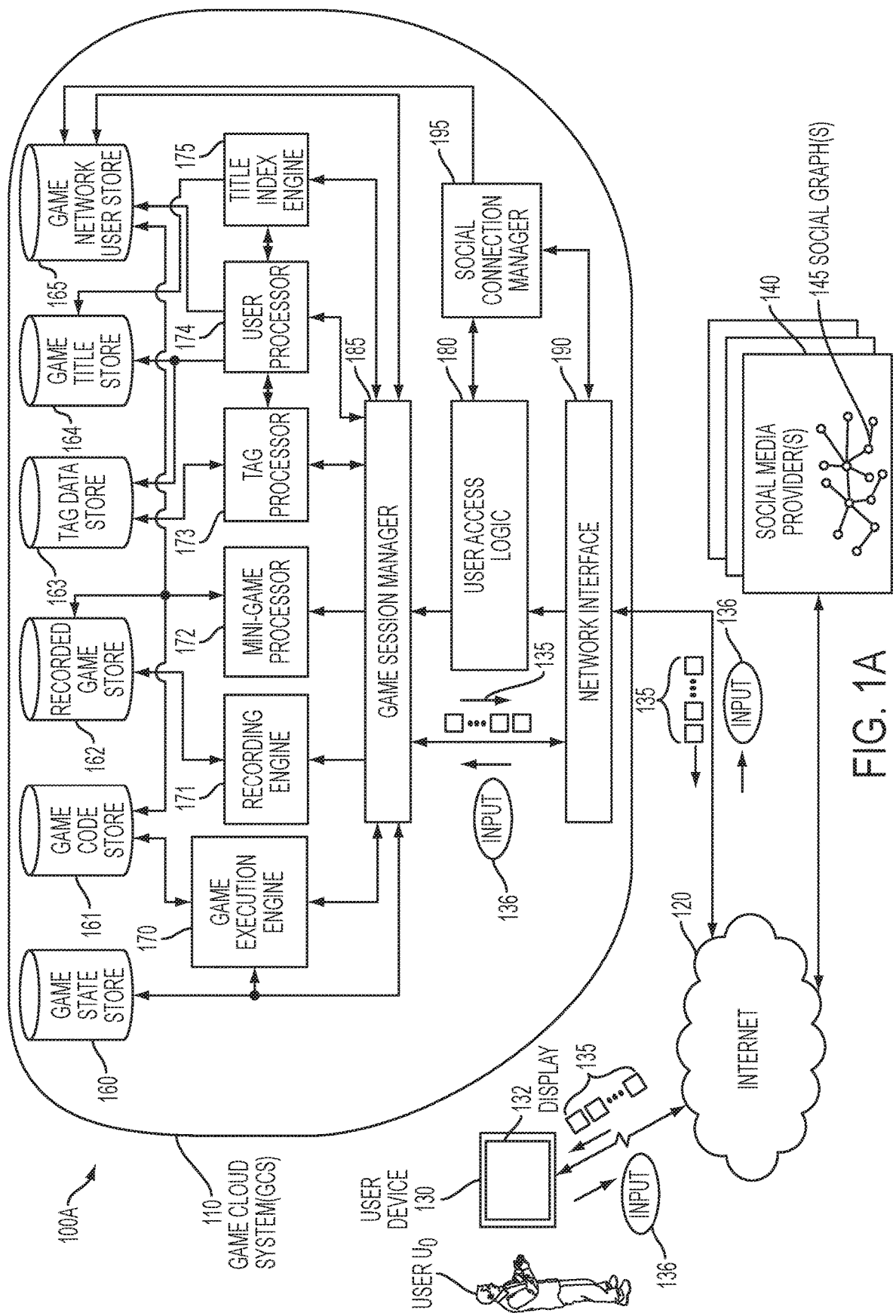
FIG. 1A illustrates a system diagram for enabling access and playing of video games stored in a game cloud system, in accordance with an embodiment of the invention.

The following embodiments describe methods and systems for tagging content in a game that is executed by a cloud-based system, and enabling the sharing of games or parts of games having the tags with others. The sharing can include, for example, sharing game content with other users that may have access to the cloud-based system already or new users. The sharing of content can also be facilitated by enabling communications between users of similar games or friends of users. The friends of users can also be discovered by interfaces with third party social networks.

As discussed in this application, mini-game creation and tagging data associated with created mini-games is discussed. In one embodiment, a mini-game may be created by a user that owns or has access to a full version of the game. When a user plays the full version of the game, a video recording is created of the game play. From this video recording, the user can select a portion of the video recording (e.g., a starting point and an ending point). This portion of the video is saved and associated to the user. In addition, this portion is used to identify game code (e.g., binary code and/or source code), metadata, and state data that was created or associated to the game play via the full version of the game, i.e., when the game was played to create the video recording. This information is in turn used to identify the portions of the code of the full game code that will be required to create an executable mini-game, that will encompass at least the functionality seen in the portion of the video that was selected from the video recording. In other embodiments, the functionality provided by the code of the mini-game may be limited in one or more ways, e.g., fewer controls, actions, characters, or options, as compared to the full version of the game. Once the mini-game is created, other users can view the video portion that was selected for the mini-game and will also be able to play an executable mini-game that parallels the code that created the video portion.

The mini-game can be shared in a social group, such as a website that displays mini-games made by many, including rankings of the mini-games. Sharing can also occur over a social network, wherein users can post their mini-games and tag data can be received by the users that wish to view or play the mini-game from the social network. The mini-games, in one embodiment, will include a video portion and an executable portion. In one embodiment, the video portion is a video of the game play of the original user that created the mini-game. In one embodiment, the executable portion is a mini-game created from the main game, for a section of the game that parallels the video portion. Once a user views the video portion, the user may wish to try the executable portion of the mini-game. While viewing the video portion, the user (and other users that view) may add tag content to the video. The tag data can also be added to the executable portion of the mini-game. Further examples and embodiments will now be described below with reference to the exemplary drawings.

It will be obvious, however, to one skilled in the art, that the present invention may be practiced without some or all of these specific details. In other instances, well known process operations have not been described in detail in order not to unnecessarily obscure the present invention.

FIG. 1A illustrates a system diagram 100A for enabling access and playing of video games stored in a game cloud system (GCS) 110, in accordance with an embodiment of the invention. General speaking, game cloud system (GCS) 110 may be a cloud computing system. System 100A includes a game cloud system (GCS) 110, one or more social media providers 140, and a user device 130, all of which are connected via Internet 120. Although one user device 130 is illustrated in system diagram 100A, it is to be understood that in practice, many more user devices may be connected to Internet 120 to access the services provided by GCS 110 and social media providers 140.

In one embodiment, game cloud system 110 includes a game execution engine 170, a recording engine 171, a mini-game processor 172, a tag processor 173, a user processor 174, a title index engine 175, a game session manager 185, user access logic 180, a network interface 190, and a social connection manager 195. Game cloud system 110 may further include a plurality of gaming storage systems, such as a game state store 160, a game code store 161, a recorded game store 162, a tag data store 163, a game title store 164, and a game network user store 165. In one embodiment, game cloud system 110 is a system that can provide game applications, services, gaming related digital content, and interconnectivity among systems, applications, users, and social networks. Game cloud system 110 may communicate with user device 130 and social media providers 140 via network interface 190 that will enable wired and wireless communication methods. In one embodiment, each social media provider 140 includes at least one social graph 145 that shows user social network connections.

In one embodiment, a social media provider can be the game cloud system 110 itself, whereby user relationships are managed without the need for external social media providers 140. In still other embodiments, the system can operate as a hybrid system, wherein social relationships are managed using social graph data from third party social media providers (via API interface accesses or the like) and user relationships with other users, as defined by the game cloud system.

In one embodiment, a user, e.g., user U0, can access the services provided by game cloud system 110 and social media providers 140 by way of user device 130. User device 130 can include any type of device having a processor and memory, wired or wireless, portable or not portable. User device 130, which is shown connected to Internet 120, includes a display 132 that can be a touchscreen, or a display typically provided by a flat-panel display, a cathode ray tube (CRT), or other device capable of rendering a display. Alternatively, the user device 130 can have its display 132 separate from the device, similar to a desktop computer or a laptop computer. In one embodiment, user device 130 can be in the form of a smartphone, a tablet computer, or hybrids that provide touch screen capability in a portable form factor. One exemplary device can include a portable phone device that runs an operating system and is provided with access to various applications (apps) that may be obtained over Internet 120, and executed on the local portable device (e.g., smartphone, tablet, laptop, desktop, etc.).

In one embodiment, user device 130 can install an application that enables execution or views of the games stored or shared by the game cloud system 110. Further, user device 130 can be used to communicate with one or more social media provider(s) 140 via Internet 120 such that user device 130 may be used to play or view games posted and shared in one or more social media providers 140. For example, user U0 may access a game posted in one of social media providers 140 by selecting a link on a page, stream, newsfeed, or post of the social media provider, and then playing or viewing the game from user device 130.

In one embodiment, the games posted and shared in social media providers 140 are mini-games generated based on video recordings of game plays. Those mini-games may be stored in recorded game store 162 of game cloud system 110. A user U0 is therefore able to play or view games or mini-games stored in game cloud system 110. Because game play is primarily executed in the game cloud system 110, the user device 130 will be receiving a stream of game video frames 135 from game cloud system 110, while user input 136 to drive the game play is transmitted back to the game cloud system 110. The received game video frames 135 (representing the video from streaming game play) are therefore shown in display 132 of user device 130.

In one embodiment, a user, e.g., user U0, may create a user account and register the created user account with game cloud system 110. After the user account is registered with game cloud system 110, game cloud system 110 may provide a user ID to this registered user account and save the user ID in a user profile associated with the registered user account. The user profile associated with a user account will be described in more detail with reference to FIG. 1C. In one embodiment, the user profile associated with a user account may be saved in a user database in game network user store 165.

In one embodiment, user access logic 180 may be used to detect accesses made by user U0 either through user device 130 or other suitable devices, and to verify the user log-in information, e.g., the name and password for the user account of user U0. After user U0 logs into his or her user account, user access logic 180 may communicate the user login information with user processor 174 that in turn updates the user login information stored in the user profile. Further, user access logic 180 may communicate the user login information with social connection manager 195, so that social connection manager 195 can pull the user's social network information from one or more social media providers 140 via network interface 190. The social network information of the user may be received by social connection manager 195, which in turn transmits the received social network information of the user to game network user store 165 to be saved in the user profile of user U0.

The social network information of a user may include, without limitation, the names of the user's social network friends, the social network activities of the user and his or her social network friends (e g, mini-game tag data entered by the user and his or her social network friends), etc. In one embodiment, the names of the user's social network friends may be obtained from one or more social graphs 145 maintained by social media providers 140.

After logging in, the user can access services provided by game cloud system 110 via game session manager 185. For example, game session manager 185 may inform user processor 174 of the user login information so that user processor 174 may record or update the user login information in the user profile (stored in game network user store 165) associated with this user. In one embodiment, user processor 174 may communicate with title index engine 175 to identify game titles associated with the user account. The game titles associated with the user account may be previously purchased by the user, previously played by the user and/or free game titles identified and made available by the game providers. In this example, available game titles may therefore be stored in game title store 164.

In one embodiment, after a user chooses an available game title to play, a game session for the chosen game title may be initiated by the user through game session manager 185. Game session manager 185 first accesses game state store 160 to retrieve the saved game state of the last session played by the user (for the selected game), if any, so that the user can restart game play from a previous game play stop point. Once the resume or start point is identified, the game session manager 185 may inform game execution engine 170 to execute the game code of the chosen game title from game code store 161. After a game session is initiated, game session manager 185 may pass the game video frames 135 (i.e., streaming video data), via network interface 190 to a user device, e.g., user device 130.

During game play, game session manager 185 may communicate with game execution engine 170, recording engine 171, and tag processor 173 to generate or save recording (e.g., video) of the game play or game play session. In one embodiment, the video recording of the game play can include tag content entered or provided during game play, and other game related metadata. The video recording of game play may be saved in recorded game store 162. Any tag content may be saved in tag data stored 163, and the metadata may be saved in game state store 160. More detail regarding the process of tagging content will be described below.

In one embodiment, a mini-game may be created using information from the video recording of the game play, e.g., via mini-game processor 172. For example, after a user plays a game and the video recording is created, the user can simply watch a replay of the video recording of his or her prior game play. When the user is watching a replay of the video recording, the user may find one or more parts to be particularly interesting. For example, the user may have achieved a high score or completed an interesting task during the game play. The user, in one embodiment, is provided with controls to select a portion of the video recording, which will then be used by mini-game processor 172 to construct a mini-game based on the selected portion of the video. In one embodiment, the mini-game will include the executable code necessary to render the functionality or part of the functionality that was used to create the content of the selected portion of the video recording.

Thus, a user wishing to play the mini-game will be provided with a substantially similar game play experience as the user that originally played the game that created the video recording. For instance, if the original game play included a scene where the user is riding a bike over a jump, and the user selects that portion from the video recording of his game play, the new mini-game would include code to enable similar or substantially similar game play. That is, the mini-game would enable the user or other users to play the mini-game, wherein game play would include riding a bike over a jump. In this case, the user playing the mini-game may or may not achieve the same game score for the jump.

The portion of the video recording associated with the created mini-game may be saved in recorded game store 162 and remaining portion of the video recording may be erased after a defined time period by recording engine 171. If no mini-games are created for a video recording of a game play, the video recording of the game play may be erased after a defined time period by recording engine 171.

In one embodiment, the created mini-game may be posted by user U0 to a webpage in a social network, via social connection manager 195, to enable sharing with his or her social network friends. Alternatively, the created mini-game may be posted by user U0 to a webpage in a game network maintained by game cloud system 110, for sharing with his or her game network friends. Sharing, however, should not be limited to friends. Sharing can also be extended to other users that may have similar likes or game play similarities.

In one embodiment, the game code that defines a mini-game can be the same code of the full game from which the mini-game was created. During the creation of the mini-game by mini-game processor 172, game play metadata, which can include game state, is used to identify what parts of the game code of the full game are needed to make an executable mini-game. When the parts of the code of the full game are all identified, the code that defines the mini-game can, in one embodiment, be defined by pointers or references to the game code of the full game. By using points and/or references, the need to create new code packages for each produced mini-game is reduced. As a user creates mini-games from their game titles, the code or pointers for the created mini-games can be associated to the creating user in the user store 165. This way, each created mini-game can be defined by its original creator, and metrics regarding play of the mini-games can be attributed to the creating user. For instance, if a particular user creates mini-game that are played and/or shared often with other users; the popularity of the mini-game can be tracked and ranked against other mini-games and users.

Still continuing with FIG. 1A, in one embodiment, during a game play, user interactive input 136 entered by user U0 may be transmitted to game session manager 185 of game cloud system 110. User interactive input 136, besides input used to drive game play, may include tag content (e.g., texts, images, video recording clips, etc.). The tag content can include game tag data entered by user U0 while playing an available full game title, as well as mini-game tag data entered by user U0 while playing a mini-game.

As noted above, the mini-game may be a mini-game that is created by user U0 based on a video recording of the game play, or a shared mini-game posted by other users, e.g., social network friends of user U0. In one example, if user interactive input 136 is tag content, the tag content may be received by game session manager 185, which in turn informs tag processor 173 and user processor 174 that the tag content is received. Tag processor 173 is used to save the tag content to tag data store 163, and user processor 174 is used to associate the tag content with the user who entered the tag content, and to save a tag pointer that points to where the tag content is stored in tag data store 163 and the user profile associated with user U0.

In one embodiment, mini-game processor 172 may be used to analyze the tag content of a mini-game, and identify video frames with more tag content as a representative frame for the mini-game. For example, when a mini-game is created, the mini-game may be shown as an icon or still image. The still image may be, for example, one of the video frames of the mini-game. The more interesting the frame is, the more likely it is that the mini-game may be played by others. Thus, in this embodiment, the frame that is selected to be the still image may be automatically selected based on the tagging data associated with particular frames.

In another embodiment, mini-game processor 172 may rank the mini-games created from various video recordings of game plays, based on the tag content of the mini-games. For instance, if certain mini-games have a higher number of tag data, this may indicate that the content is interesting and/or is being shared the most. As such, some mini-games can be displayed more prominently on a website, relative to other mini-games, based on the degree of tagging that such mini-games experience.

Figure 1B:
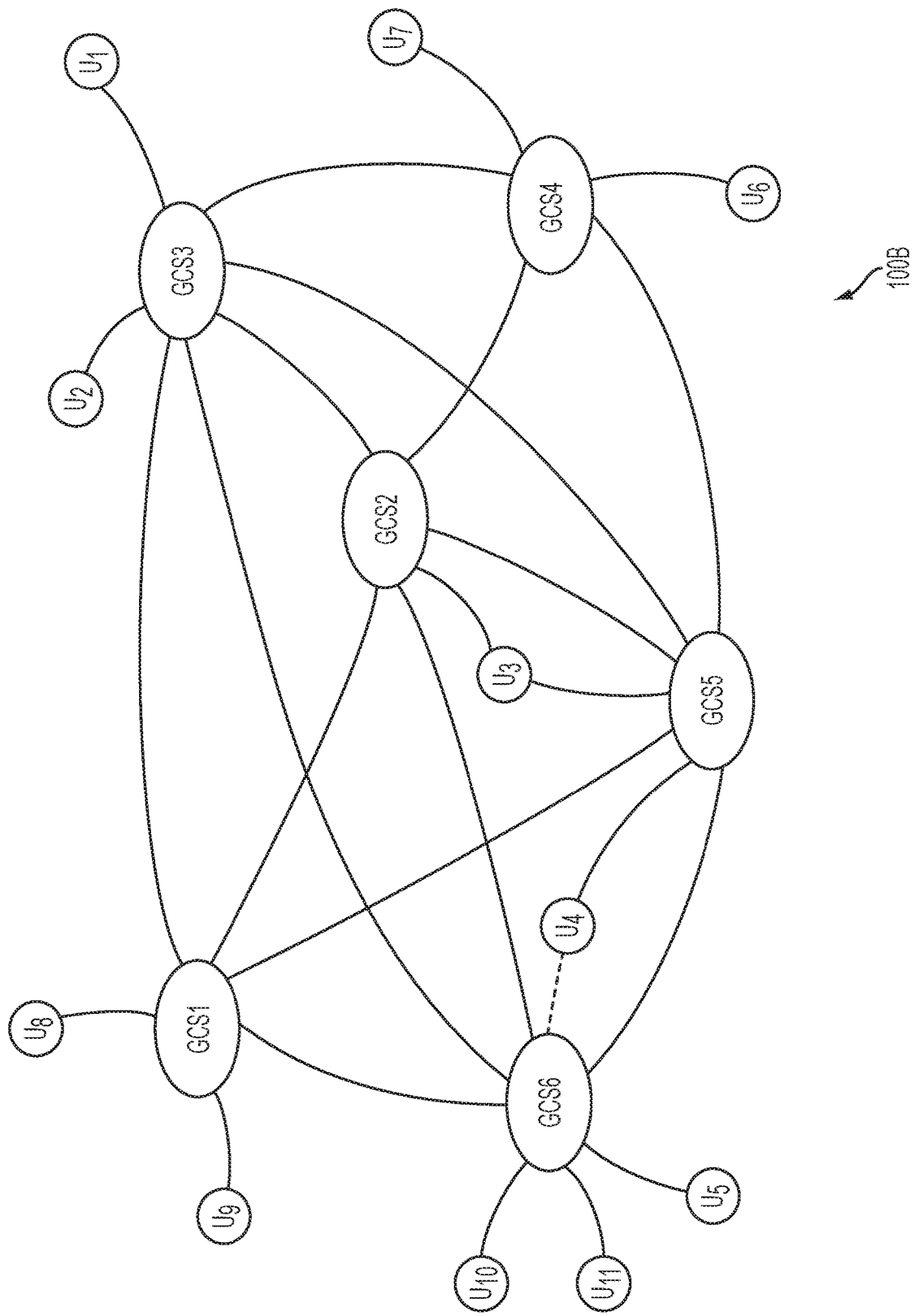
FIG. 1B illustrates a game cloud network, in accordance with one embodiment of the present invention.

FIG. 1B illustrates a game cloud network 100B, in accordance with one embodiment of the present invention. For example purposes only, the game cloud network 100B may include six game cloud systems (GCS1 to GCS 6), which are geographically distributed and interconnected. Also for purposes of example, eleven users (U1 to U11) are shown in FIG. 1B with different geographical distances to each of the six GCSs. To reduce latency, the GCSs are distributed and users that are more proximate to certain GCSs will be paired to the more local GCS.

As shown in FIG. 1B, users U1 and U2 are geographically located closer GCS3, user U3 is located about in the middle of the distance between GCS2 and GCS5, user U4 is located in between GCS 5 and GCS 6 but is closer to GCS 6, users U6 and U7 are located near GCS4, users U8 and U9 are located near GCS1, and users U5, U10, and U11 are located near GCS6. Although six game cloud systems and eleven users are shown, it is to be understood that in practice, more or less game cloud systems may be included in game cloud network 100B, and more or less users may access the services provided by game cloud network 100B.

In one embodiment, each GCS in game cloud network 100B is located in a data center that houses computer systems and associated components to support multiple operating systems. As an example, the structure of each GCS may be similar to GCS 110 as shown in FIG. 1A. Although, it should be understood that a GCS may include fewer or more processing components or logic elements, depending on the processing desired. In one embodiment, each GCS in game cloud network 100B may communicate with other GCSs so that the information for various user profiles stored in respective game network user stores of a GCS can get updated and synchronized. Through the communication among the GCSs, game cloud network 100B can dynamically distribute the work load to provide load balancing and assign users based on the work load of each GCS and distance factors.

In one embodiment, when a user is trying to log into his or her user account online via a user device, depending upon the geographical location of the user, the user may be routed to a GCS that is closest to his or her user device. For example, because user U1 along with his or her user device is located near GCS3, user U1 utilizes the game services provided GCS3 after his or her user device is connected to GCS3. Similarly, user U2 may utilize the game services provided by GCS3, user U7 and user U6 may utilize the game services provided by GCS4, user U8 and user U9 may utilize the game services provided by GCS1, and user U5, user U10, and user U11 may utilize the game services provided by GCS6, based on geographical distance to respective CGSs.

In another embodiment, when a user is located approximately in the middle of two GCSs, the user may access the game services provided by both GCSs. For example, user U3 is located approximately in the middle of GCS2 and GCS5. When user U3 is trying to log into his account, the user device of user U3 may be connected to either GCS2 or GCS5, or both GCSs, depending upon the work load and latency of the GCSs. In still another embodiment, a user may be connected to a GCS that is not the closest one to this user because the GCS that is closest to this user is experiencing heavy work load. For example, user U4 may be initially connected to GCS6 because user U4 is located closest to GCS6. Due to heavy work load of GCS6, user U4 may be disconnected from GCS6 and be connected to GCS5. During the period of switching from GCS6 to GCS5, user U4 may be temporarily connected to both GCS6 and GCS5 for a while, and then get disconnected from GCS6 after GCS5 has replicated the game state of user U4 in GCS6. Thus, the switching from one GCS to another GCS is transparent to the user without affecting the user's experience with the game. In another example, user U4 may be directly routed to GCS5 because GCS5 has larger capacity than GCS6.

Figure 1C:
FIG. 1C illustrates an exemplary user profile stored in a game cloud system, in accordance with one embodiment of the present invention.

FIG. 1C illustrates an exemplary user profile 100C stored in a game cloud system 110, in accordance with one embodiment of the present invention. In one embodiment, user profile 100C may be saved in a user database stored in game network user store 165 of game cloud system 110. In this example, user profile 100C includes a "User Name" field, a "User ID" filed, a "User Password" field, a "User Login" field, a "User Level" field, a "User Awards" field, a "Friends" field, a "Game Titles" field, and a "User Tags" field.

In one embodiment, the "User Name" field, the "User ID" field, and the "User Password" field are used to record the name of the user, the ID assigned to the user when he or she created the user account in game cloud system 110, and the password set up by the user. The "User Login" field is used to indicate whether this user is currently logged into his or her user account. As discussed above, the user login information may be updated by user processor 174. The "User Level" field is used to indicate the game play levels of the user. The "User Awards" field shows the awards received by the user during previous game plays.

In one embodiment, the "Game Titles" field shows all available game titles for the user. The available game titles may be those that the user is able to freely play because either the user purchased the game or the game is free to play. In still other embodiments, the Game Titles field can show or identify the games that the user is able to see, such as, based on the rating of the games. If the player is a minor, only selected games would be made accessible for that player.

As discussed above, a user may create one or more mini-games based on a video recording of a game title played by the user. If one or more mini-games are created for the game title, the created mini-games will be shown under this game title. In this example, there are three available game titles for the user (Game Title 1, Game Title 2, and Game Title 3), and one mini-game (Mini-Game 1) is created from Game Title 2. In one embodiment, the user can start to play a game by selecting (clicking, selecting, touching, etc.) on the available game title shown in user profile 100C. In still other embodiments, mini-games can be shown on a separate webpage, where a user can select to play mini-games created by the user or created by other users. The mini-games shown can be organized based on game-types, genres, age appropriate, etc. Mini-games having larger numbers of plays or tags maybe ranked higher or placed in a more prominent location on the webpage. From this webpage of mini-games, users can access to play such mini-games or share the mini-games with others within the game network or externally via social networks.

In one embodiment, the "User Tags" field in user profile 100C lists tag content entered by users. As discussed above, the entered tag content is stored in tag data store 163. For each tag content listed in the "User Tags" field, there is an associated tag pointer that points to the tag content stored in the tag data store 163. The tag content stored under the "User Tags" field may be (a) game tag data entered by the user during a game play of the original full game title, (b) game tag data entered by the user while viewing the video recording from the game play of the full game title, or (c) game tag data entered by any user viewing the portion of the video recording used to make or define the mini-game, or (d) game tag data entered by any user while playing the mini-game the video portion (the portion being the portion that was selected from the video recording to define the mini-game).

In one embodiment, a mini-game may be created by a user that owns or has access to a full version of the game that is used to create the mini-game. When a user plays the full version of the game, a video recording is created of the game play. From this video recording, the user can select a portion of the video recording (e.g., a starting point and an ending point). This portion of the video is saved and associated to the user. In addition, this portion is used to identify metadata and state data that was created when the full version of the game was played to create the video recording. This information is in turn used to identify the code parts of the full game code that will be required to create an executable mini-game, which will encompass at least the functionality seen in the portion of the video that was selected from the video recording. In one embodiment, once the mini-game is created, the mini-game may have two parts.

For example, a first part is the portion of the video selected by the user, from the full video recording. This portion can be posted and shared, so that other users can see a video of the user's game play and the results (which may have been interesting). Once a person views the video portion, the person can elect to play a mini-game for that portion of video.

Also for example, a second part is the executable mini-game. As in the example above, if the portion of the video shows the user jumping an obstacle on a bike, the mini-game will provide code to allow another player to attempt the jump of the obstacle on the bike. The game scores achieved by the original player using the full game can then be compared to the score achieved by the other player. The other player may also get a good score, which may be interesting to share.

Thus, to provide further sharing, a third part may be the creation of a secondary video portion that is a recording of game play of the mini-game by other users. Thus, as more players play the mini-game, there will be many secondary recordings of those game plays, which will also be saved and associated with the original mini-game and to the players.

In this example, however, the creator of the mini-game is going to be the owner of the full version of the game. If the person playing the mini-game wishes to make a mini-game him or herself, that person can purchase the full copy (or full locked access) and produce his or her own mini-games that can be shared in the same way.

In one embodiment, the "Friends" field in user profile 100C shows the user's friends in both game network and social network. In this example, the user's game network friends are shown under the "Game Network" sub-field and the user's social network friends are shown under the "Social Network" sub-field. The user's friends who belong to both the game network and the social network may be listed under the "Common" sub-field.

For a user profile stored in game network user store 165, the "User Name" field, the "User Login" field, the "User Level" field, and the "User Awards" field may be viewable to other users in the game network, while the other fields in the user profile may not be viewable to other users. In one embodiment, a user may select whether to make the "Friends" field in his or her user profile to be viewable by other users.

Figure 2A:
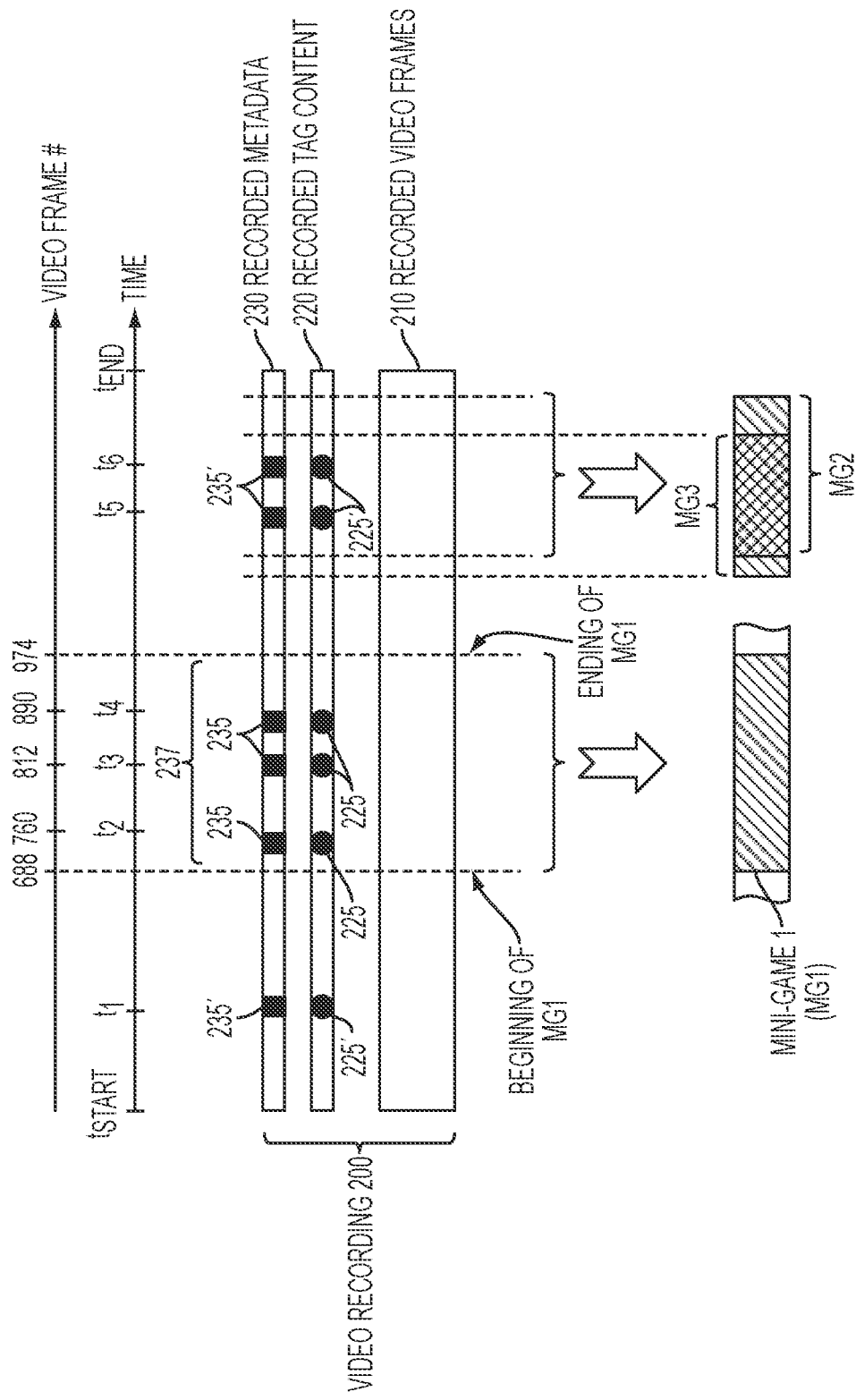
FIG. 2A illustrates mini-games created based on a video recording, in accordance with one embodiment of the present invention.

FIG. 2A illustrates mini-games created based on a video recording 200, in accordance with one embodiment of the present invention. In this example, after a user (or a game player) has played an available game title, either the complete game or part of the game, the game played may be saved as video recording 200. In this example, video recording 200 includes recorded video frames 210 for the game played, recorded tag content 220, and recorded metadata 230. Recorded tag content 220 includes tag pointers that point to game tag data 225 and 225' (represented as solid circles) added during the game play (e.g., tags added when the game is paused or the like), the time when the game tag data 225 and 225' was entered and associated video frames for game tag data 225 and 225'. For example, game tag data 225 are respectively entered at time t2, t3, and t4, and is associated with video fames number 760, 812, and 890 of recorded video frames 210. In one embodiment, game tag data 225 and 225' may be stored in tag data store 163 of game cloud system 110, and be pointed by game tag data pointers stored in recorded tag content 220.

In one embodiment, when a game player wants to enter game tag data during the game play or execution, the game player can send a pause indication to suspend the game play through a user interactive input, e.g., a tagging button displayed on a display of the user device used to play this game. When the game play is suspended, the game state in response to the pause indication may be stored in game state store 160 of game cloud system 110. The solid squares 235 and 235' in recorded metadata 230 indicate the corresponding saved metadata (including game state) when game tag data 225 and 225' are entered, respectively. When video recording is viewed, the associated tag content may be shown along with the video frames in recorded video frames 210.

In one embodiment, the game player may create a mini-game (MG) based on video recording 200 by indicating a start position and an end position of the mini-game, during a view of video recording 200. For example, based on video recording 210, the game player may choose video frame 688 as the beginning of MG1 and video frame 974 as the ending of MG1 by clicking and unclicking a mini-game creation check box displayed on a screen, respectively. The created MG1 is playable to view the video recording of MG1 that is a portion of video recording 200, and is executable to play game code of MG1 that is a portion of the full game code of the original game title played by the game player. The video recording of MG1, in one embodiment, has associated therewith, game tag data 225 and metadata 237. When the video recording of MG1 is viewed, game tag data 225 may be shown along with the associated video frames for MG1. In one embodiment, it can be an option to turn on or off the viewing of tags when viewing the recorded video of MG1.

In another embodiment, multiple mini-games can be created based on video recording 200. As shown in FIG. 2A, MG1 is not overlapped with MG2 and MG3, and MG2 and MG3 are partially overlapped with each other. In one embodiment, the created mini-games, e.g., MG1, MG2, and MG3, may be saved in recorded game store 162 by mini-game processor 172 of game cloud system 110.

Figure 2B:
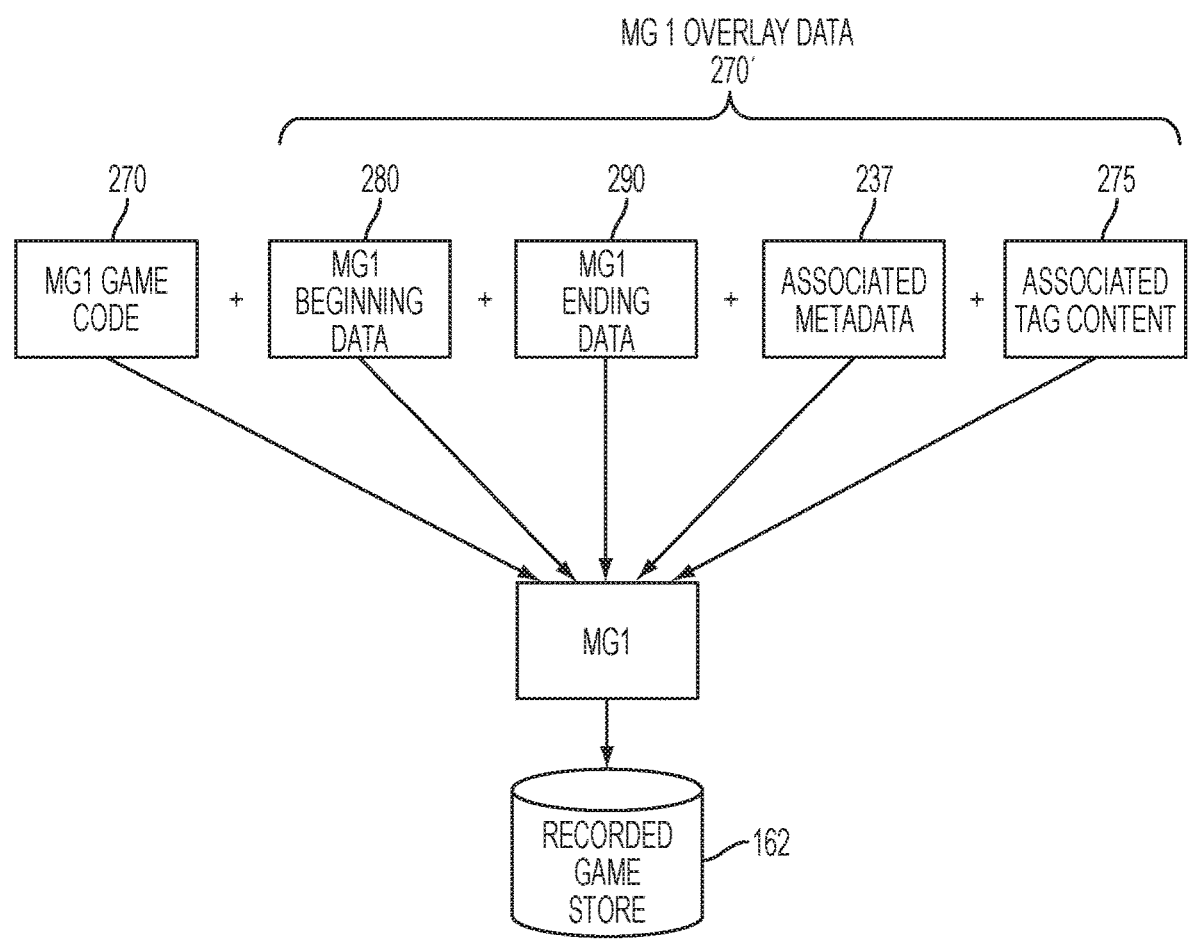
FIG. 2B illustrates components of a created mini-game, in accordance with one embodiment of the present invention.

FIG. 2B illustrates components of a created mini-game, e.g., MG1, in accordance with one embodiment of the present invention. MG1 includes MG1 game code 270 and MG1 overlay data 270'. MG1 game code 270 is a portion of the game code for the game played (i.e., full game), and MG1 overlay data 270' includes MG1 beginning data 280, MG1 ending data 290, associated metadata 237, and associated tag content 275. Although not shown, the portion of video that was selected to define the start and end of the MG1, can also be provided or associated with the MG1. Tag content 275 may include game tag data 225 entered by the game player during the game play, and mini-game tag data entered during a view for MG1, by either the game player or other users after the game player posted MG1 for sharing in a network. The overlay data 270' is integrated with MG1 game code 270. MG1 beginning data 280 may include a pointer pointing to the beginning of MG1 game code 270, and MG1 ending data 290 may include a pointer pointing to the ending MG1 game code 270. In one embodiment, MG1 beginning data 280 may further includes MG1 creation date, MG1 ownership, and other MG1 related information. MG1 may be saved in recorded game store 162 of game cloud system 110.

Figure 2C:
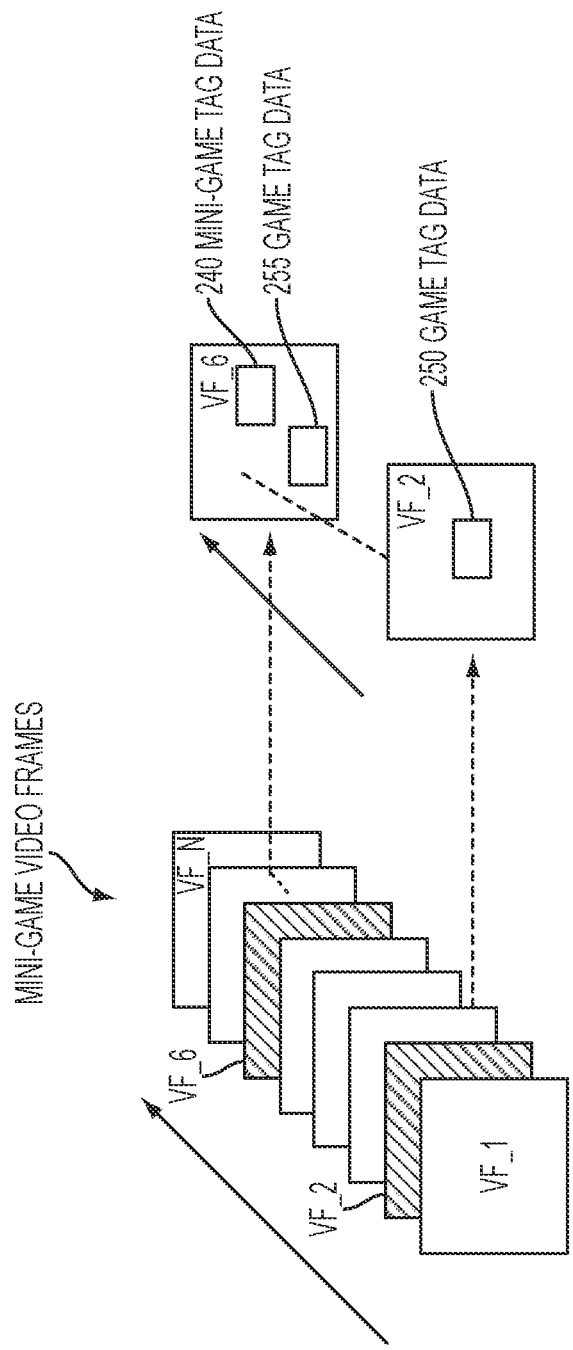
FIG. 2C illustrates video frames of a created mini-game integrated with tag content, in accordance with one embodiment of the present invention.

FIG. 2C illustrates video frames of a created mini-game integrated with tag content, in accordance with one embodiment of the present invention. In this example, the created mini-game includes a plurality of video frames (VF_1 to VF_N) and the shaded video frames (VF_2 and VF_6) represent the video frames integrated with tag content, indicating the quantities and locations of the tag content in corresponding video frames. As shown, video frame VF_2 is integrated with game tag data 250 and video frame VF_6 is integrated with both game tag data 255 and mini-game tag data 240.

Figure 2D:
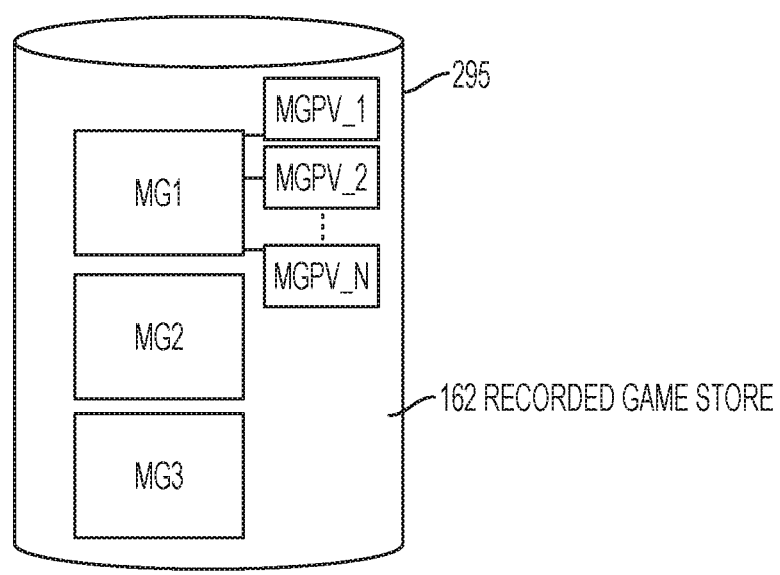
FIG. 2D illustrates a cloud store that saves the created mini-games (MGs) and associated mini-game play videos (MGPVs), in accordance with one embodiment of the present invention.

FIG. 2D illustrates a cloud store 295 that saves the created mini-games (MGs) and associated mini-game-play videos (MGPVs), in accordance with one embodiment of the present invention. A MGPV is a secondary video that is a recording of game play by users that wish to play the mini-game that was earlier created. As such, the more plays that the mini-game gets, the more MGPVs will be created for that mini-game. Very popular mini-games will have more MGPVs and it may be possible to rank the MGPVs, such that the higher score MGPVs or most tagged MGPVs will be shown first or can be filtered into a particular order to search. In this example, three mini-games (MG1, MG2, and MG3) are stored in cloud store 295. In one embodiment, cloud store 295 may be recorded game store 162 of game cloud system 110, and the created mini-games are saved by mini-game processor 172.

The stored mini-games can be posted and shared by the respective mini-game creators in either a game network or a social network. As shown in FIG. 2D, a plurality of MGPVs (MGPV_1, MGPV_2, MGPV_N) can be created based on the plays or executions of MG1, after one or more users play the shared MG1.

Figure 2E:
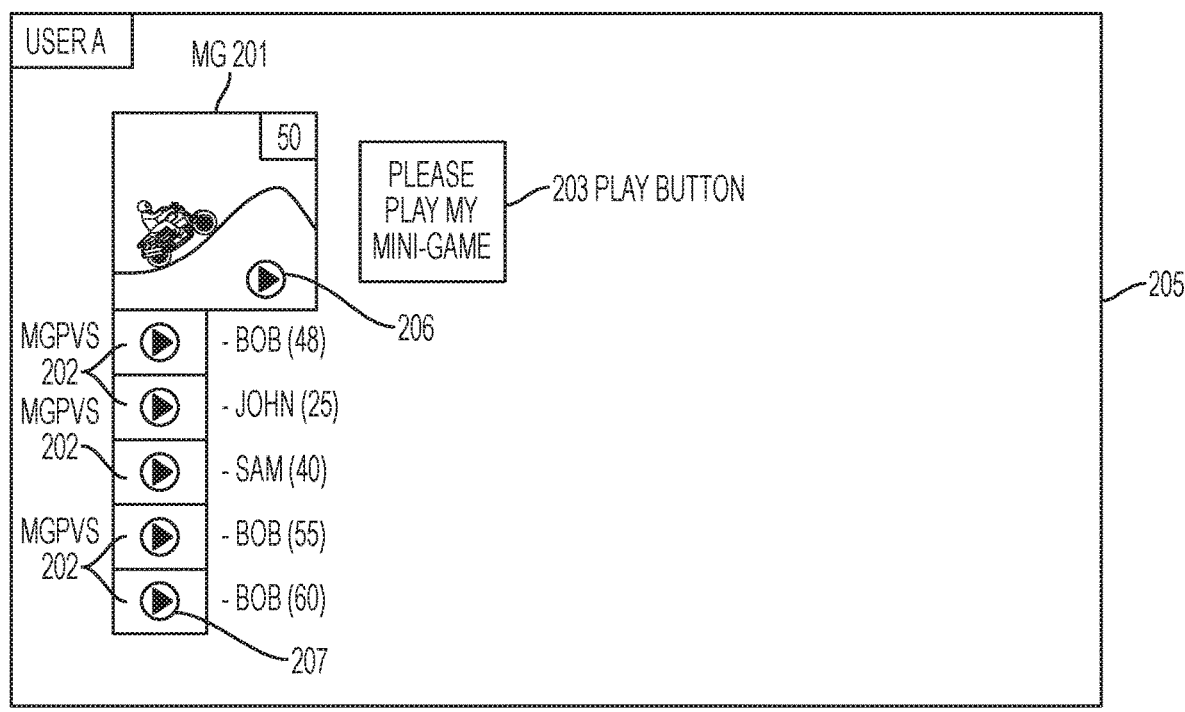
FIG. 2E illustrates a webpage displaying a shared mini-game and associated mini-game play videos (MGPVs), in accordance with one embodiment of the present invention.

FIG. 2E illustrates a webpage 205 displaying a shared mini-game (MG 201) and associated mini game play videos (MGPVs) 202, in accordance with one embodiment of the present invention. As shown, webpage 205 includes a MG 201 posted and shared, e.g., by the mini-game creator, a play button 203 for the shared MG 201. The play button 206 may enable replay of the video portion of the originally played game by the creator of the mini-game. If after watching the mini-game video, the user wishes to try playing an executable version of the game that is created for mini-game 201, the user may push the play button 203 to attempt to play the game that is substantially similar to the game play that is shown in the video portion, shown when pushing icon 206.

If mini-game gets a lot of plays, either due to popularity or by sharing, the mini-game may get a history of plays. This history of plays will be represented by the mini-game play videos (MGPVs) 202, which will have corresponding play buttons 207. Users wishing to view the prior plays by others can browse through the prior plays, and then if the user wishes to attempt play themselves, the user can simply hit/select the play button 203 to play the mini-game.

In one example, webpage 205 may be a webpage in the mini-game creator's social network. The social network friends of the mini-game creator may simply view the shared MG 201 in website 205 by clicking the MG play icon 206. As discussed above, during a view of mini-game 201, the user can temporarily pause mini-game 201 to enter mini-game tag data, and then resume the view of mini-game 201.

In one embodiment, the tag data can be assigned to a location in a video frame. The location can be a coordinate location of the display. The coordinate location is saved, and provided to the tag processor. The tag location being saved, enables later presentation of the tag data at the location identified by the entering user. The tag location can be set, for example, by allowing the user to place the tag data at a particular area of the screen, associate the tag data to an object shown in the screen, or link the tag data to some event shown in the screen. Once the user sets the location, the system will identify screen coordinates and associate the tag data to one or more frames.

For example, even though the tag data is set at one still video frame view, when the tag data is shown, it can be allowed to stay in a viewable state for a period of time, which can encompass multiple frames of video. For example, tag data can be shown, during playback, for several seconds. If the frame rate of the video is, for example, 60 frames per second (other frame rates are possible, either slower or faster), it should be understood that tag data can be displayed for a period of time that will involve the display of many frames of video. It is also understood that frames will, in some embodiments, include compression to reduce transmission latency.

In one embodiment, the game manufacturer of the original game title based on which MG 201 is created may identify the users who frequently play the shared MG 201 or the users who got high play scores, and send target emails or advertisements to those identified users. In this example, Bob has played the posted MG 201 three times with decent scores. Thus, the game manufacturer may send an email, text, post or message to Bob to advertise the original game title and offer purchase discount. Alternatively, if MG 201 is a very popular shared mini-game in the cloud, the game manufacture may study the video frames and the actions associated with MG 201 and create new games that include video frames and actions similar to the ones in MG 201.

Figure 2F:
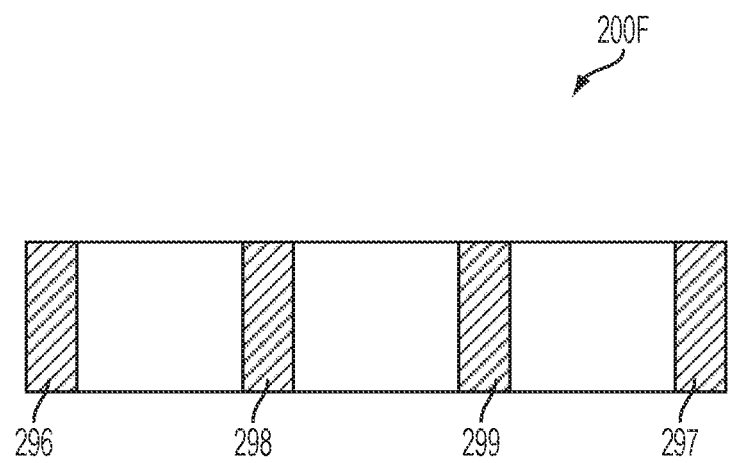
FIG. 2F illustrates a mini-game having user generated content (UGC) inserted at various locations of the mini-game, such as the beginning, the end, and dispersed at various locations in the mini-game, in accordance with one embodiment of the present invention.

FIG. 2F illustrates a mini-game having user generated content (UGC) inserted at various locations of the mini-game, such as the beginning, the end, and dispersed at various locations in the mini-game, in accordance with one embodiment of the present invention. In this example, mini-game 200F has been integrated with four UGC sections. The UGC sections can be added at various locations of the mini-game, such as the beginning, end and/or dispersed at particular locations within the mini-game. In one embodiment, the UGC sections can be video clips, images, separate micro-games, stores, animations, sound files, etc. In one embodiment, the UGC sections can be videos, such as an introductory video clip 296, a user inserted/selected video clip 298, user inserted/selected video clip 299, and a finally video clip 297. The UGC sections may include greetings from the user who created mini-game 200F and/or a brief introduction of mini-game 200F. In another example, video clip 297, which is attached to the end of mini-game 200F, may contain user summaries for mini-game 200F or information on related mini-games by the same player or friends of a player. In yet another example, user video clips 298 and 299, which are inserted in the middle of mini-game 200F, may contain user comments and game play know-how for the mini-game play scene immediately after or before each of user video clips 298 and 299. Again, as noted above, the UGC sections can be in the form of digital content, which can include video clips, audio clips, still images, sounds, image transitions, user voice data, training audios, or combinations thereof.

In still another embodiment, the mini-game play videos (MGPVs) 202 (shown in FIG. 2E), can be provided with UGC sections, in the same way as described for mini-games. For instance, the MGPVs can have an introductory content, content injected and integrated within the MGPV, and content at the end with concluding data. The ability to add UGC sections to mini-games and mini-game play videos allows users to customize their created content. Customization encourages users to share their created mini-games, such as in a social network or the like.

Figure 3A:
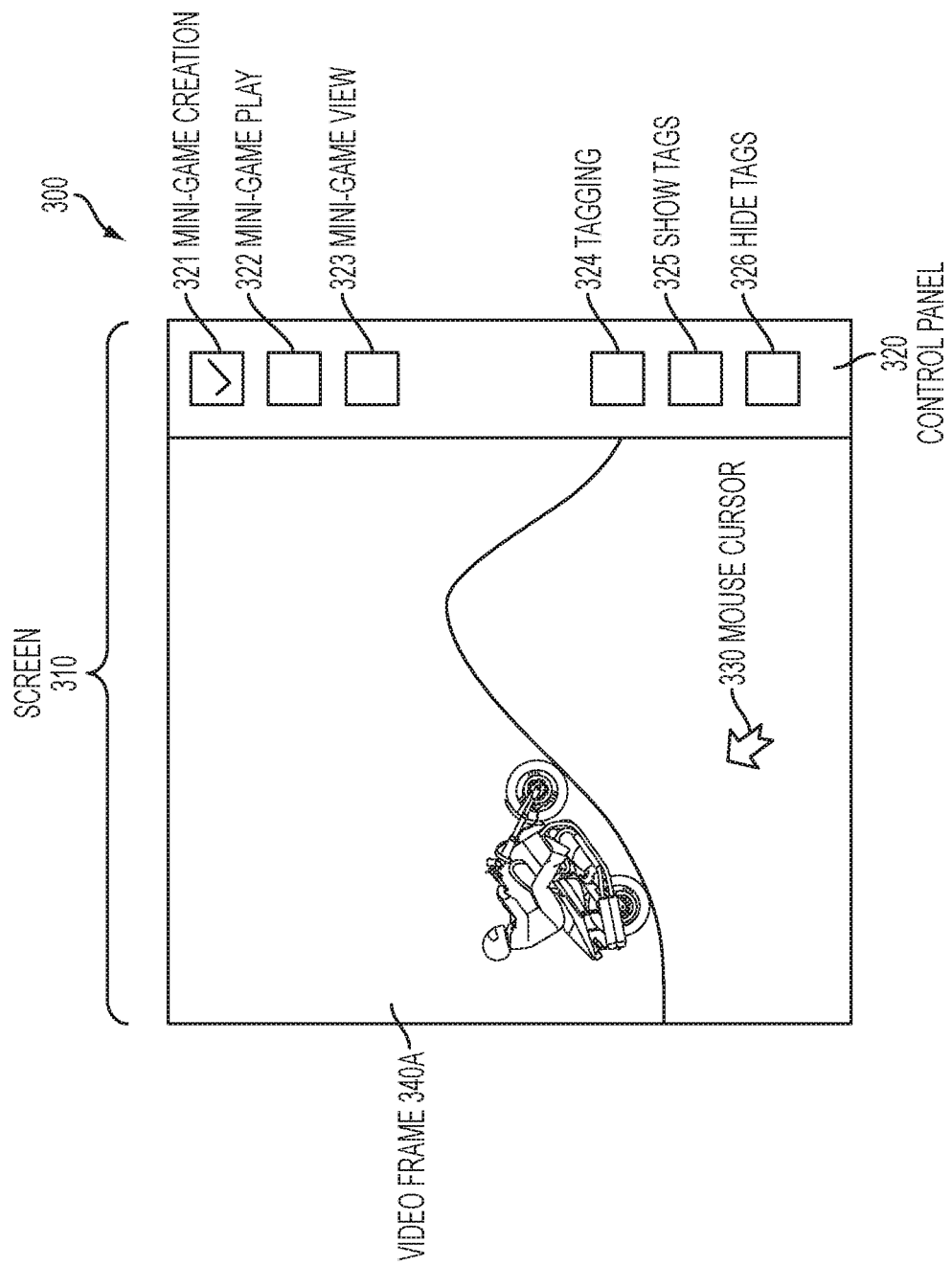
FIG. 3A illustrates a game display, in accordance with one embodiment of the present invention.

FIG. 3A illustrates a game display 300, in accordance with one embodiment of the present invention. The game display 300 includes a screen 310 that shows a video frame 340A and a control panel 320. In this example, control panel 320 includes six control check boxes: "Mini-game Creation" check box 321, "Mini-game Play" check box 322, "Mini-game View" check box 323, "Tagging" check box 324, "Show Tags" check box 325, and "Hide Tags" check box 326. Although six check boxes are shown in control panel 320 that is displayed vertically along the right edge of screen 310 for this embodiment, it is to be understood that in practice, more or less game control check boxes may appear in a control panel and the control panel may be shown in any position of a game display screen. Furthermore, the controls in control panel 320 may be implemented in other forms, such as radio buttons, push buttons, drop-down menus, voice inputs, gesture detection, touch input, etc. The current location of mouse cursor 330 in video frame 340A is shown in screen 310.

In this embodiment, the video frame 340A is a video frame of a video recording of a game play. A user may create a mini-game during the view of the video recording. For example, the user may identify the beginning (or start position) of the mini-game by checking "Mini-game Creation" check box 321 when the beginning video frame of the mini-game appears on screen 310, and identify the ending (or end position) of the mini-game by unchecking "Mini-game Creation" check box 321 when the ending video frame of the mini-game appears on screen 310. The created mini-game may be posted for sharing in a webpage of a network. "Mini-game Play" check box 322 is used to play the shared the mini-game, and "Mini-game View" check box 323 is used to view the shared mini-game.

In one embodiment, "Tagging" check box 324, "Show Tags" check box 325, and "Hide Tags" check box 326 are tag controls for entering tag content for both the game and the mini-game. Tag content includes game tag data and mini-game tag data. For the original game title, game tag data may be entered either during a play of the game title or during a view of the video recording of the game play. For the mini-game created based on the video recording of the game play, mini-game tag data may be entered during a view of the mini-game.

Figure 3B:
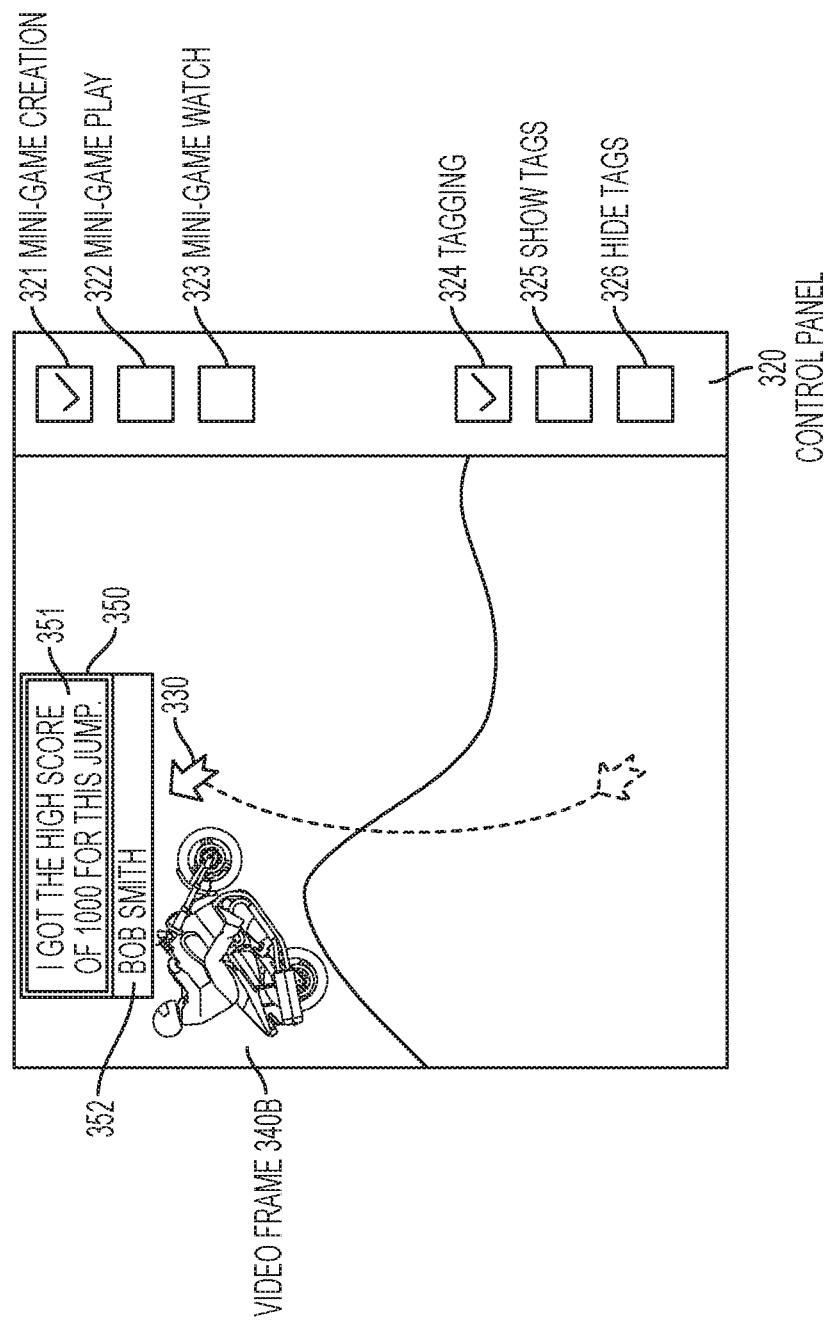
FIG. 3B illustrates a tagging process for a shared mini-game in a cloud, in accordance with one embodiment of the present invention.

FIG. 3B illustrates a tagging process for a shared mini-game in a cloud, in accordance with one embodiment of the present invention. During a view of the shared mini-game, a user may identify a video frame of the mini-game and enter mini-game tag data in a desired location in the identified video frame. The tagging process may be started or ended by checking or unchecking "Tagging" check box 324 in control panel 320. When "Tagging" check box is checked, the video frame that is currently shown in screen 310, e.g., video frame 340B, may be suspended by a pause indication. Then, the user may move mouse cursor 330 (or other input form) from the original location (shown in dashed lines) to a desired tagging location in video frame 340B. In one embodiment, the user may double click the mouse in the desire tagging location to open up a tagging window 350 to enter mini-game tag data 351, e.g., the sentence of "I got the high score of 1000 for this jump." Although mini-game tag data 351 in this embodiment is text, in other embodiments, mini-game tag data may be images, video clips, etc. The entered mini-game tag data 351 is associated with video frame 340B.

During a play of the game or a view of the video recording of the game play, game tag data can be entered similar to the mini-game tag data entering method described above.

In this example, the user identifier (UID) of the user ("Bob Smith") who entered mini-game tag data 351 is shown in user identifier display 352 underneath tagging window 350. The user who entered mini-game tag data 351 may be the one who created the mini-game or other users who viewed the shared mini-game in the cloud. In another embodiment, user identifier display 352 may also show the time when the user entered mini-game tag data 351 and indicate whether the tag content in tagging window 350 is mini-game tag data. In still yet another embodiment, the user who entered the tag content may choose whether to display his or her identity.

Figure 3C:
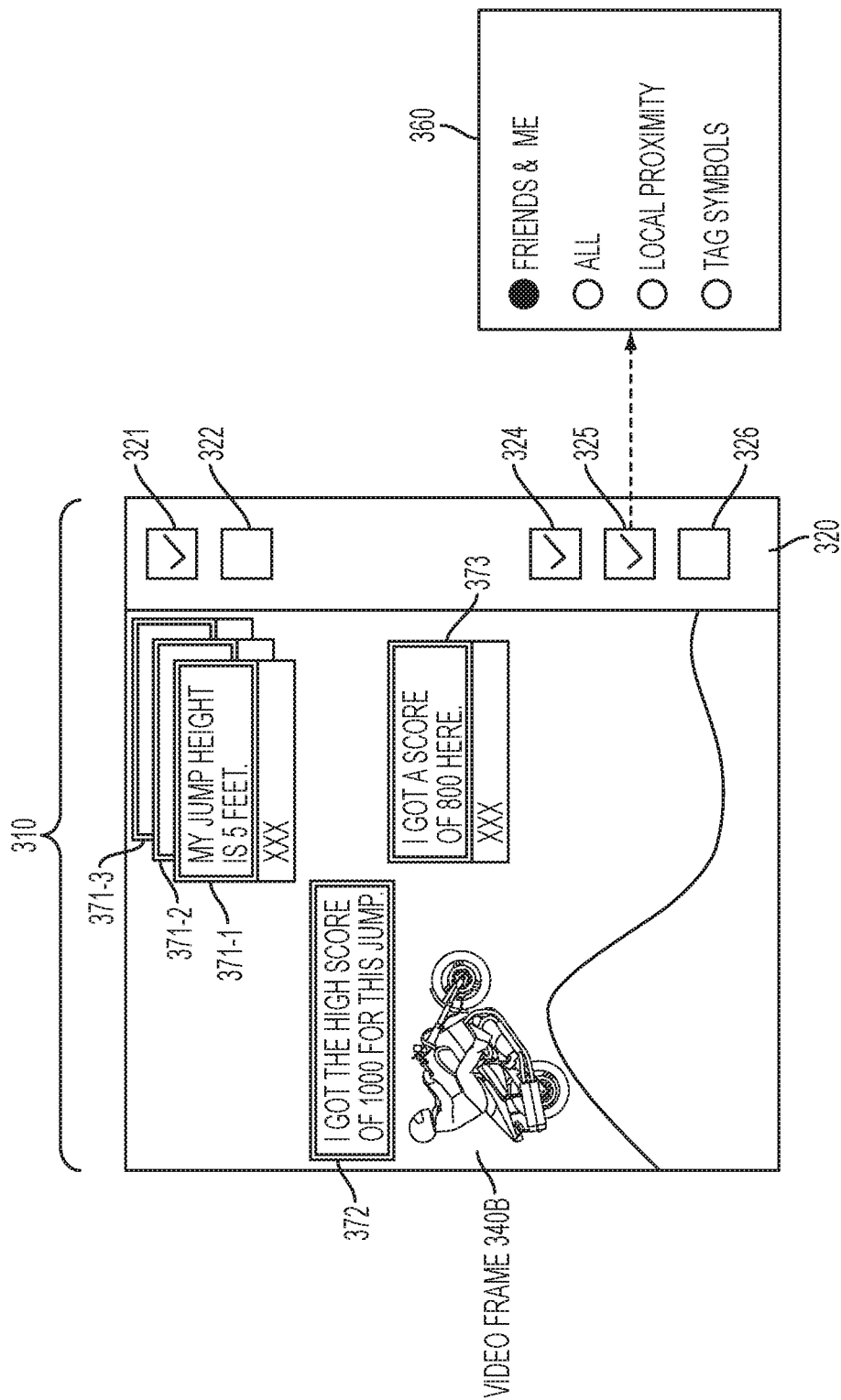
FIG. 3C illustrates a video frame that shows tag content, in accordance with one embodiment of the present invention.

FIG. 3C illustrates a video frame 340B that shows tag content during a view of a mini-game, in accordance with one embodiment of the present invention. When a user plays or views a game or mini-game, the user may choose to show or hide the tag content associated with various video frames of the game or mini-game. For example, the user may display the tag content or hide the tag content for the video frames by checking "Show Tags" check box 325 or "Hide Tags" check box 326 in control panel 320. After the user checks "Show Tags" check box 325, a pop-up window 360 appears, showing four tag display options: "Friends & Me," "All," "Local Proximity," and "Tag Symbols." The "Friends & Me" option will enable the display for all tag content entered by the current user and his or her friends. The "All" option will enable the display for all tag content. The "Local Proximity" option will enable the display for the tag content entered by users who are within a pre-defined local proximity around the user device having screen 310. The "Tag Symbols" option will enable the display for all tag content in pre-defined symbols. In this example, the "Friends & Me" option is chosen, thus, six tagging windows (371_1, 371_2, 371_3, 372, and 373) with tag content entered by either the current user or his or her friends are shown in video frame 340B. Tagging windows 371_1, 371_2, and 371_3 overlaps because the tag content associated with those three tagging windows are either entered at the same or proximately the same location in video frame 340B. Tagging window 372 shows the tag content without showing user identity, while tagging windows 371_1, 371_2, 371_3, and 373 show both the entered tag content and the user identifiers.

Figure 3D:
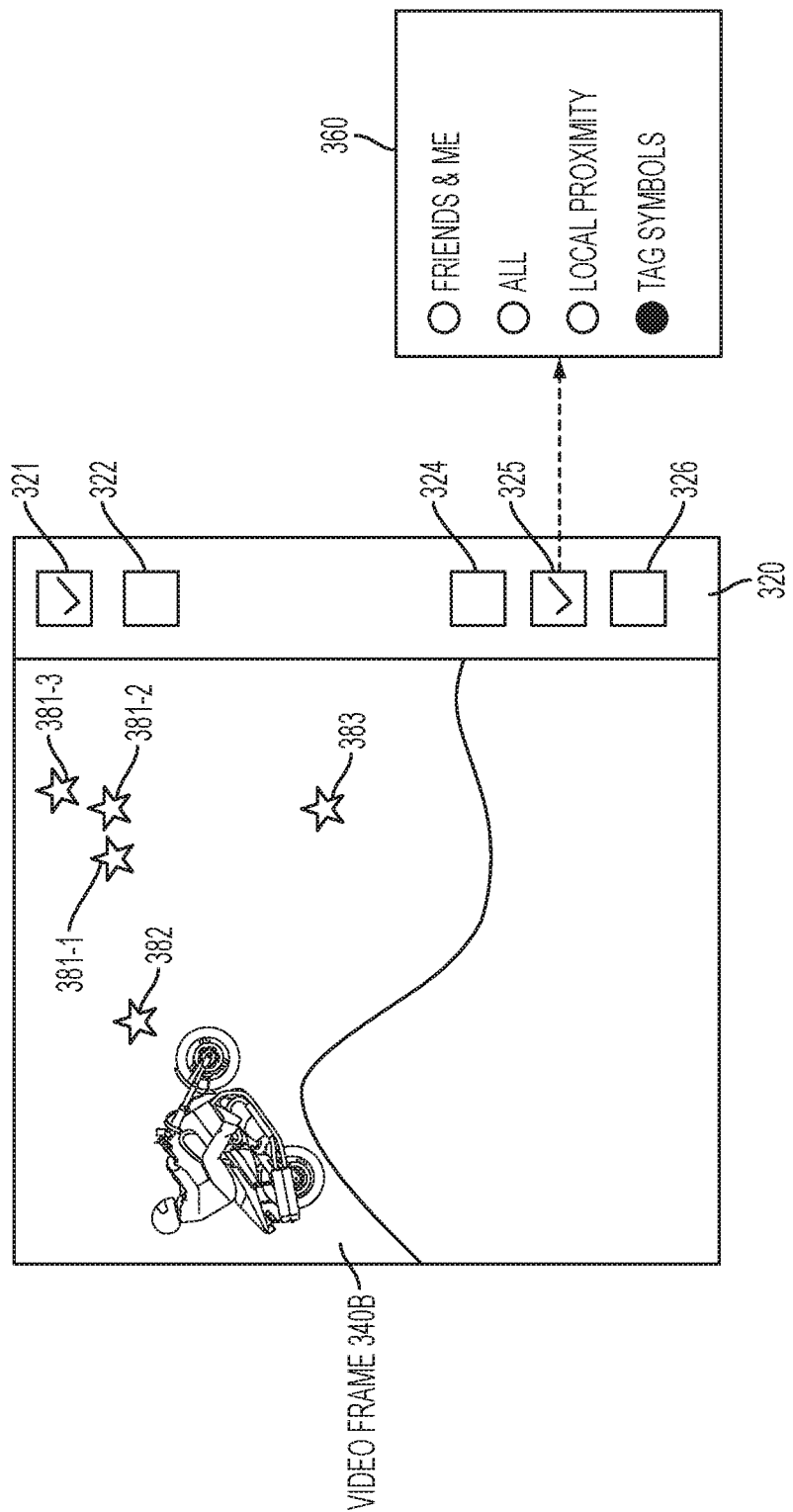
FIG. 3D illustrates a video frame that displays entered tag content in tag symbols, in accordance with one embodiment of the present invention.
Figure 4A:
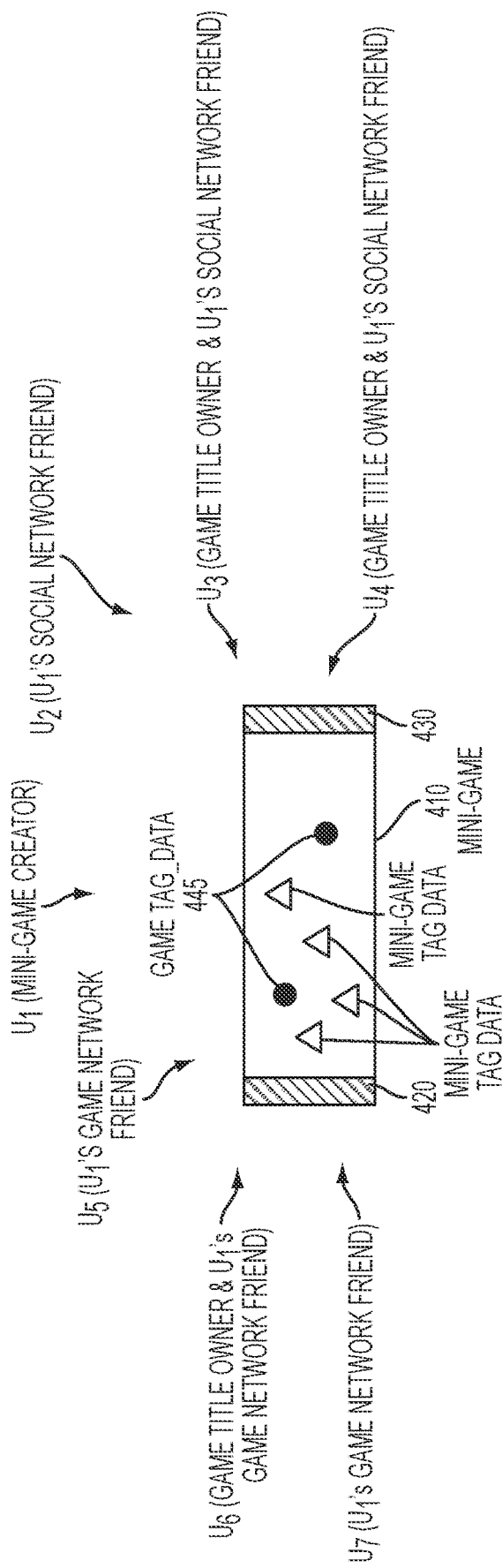
FIG. 4A illustrates a mini-game integrated with tag content, in accordance with one embodiment of the present invention.

FIG. 3D illustrates a video frame 340B that displays entered tag content in tag symbols, in accordance with one embodiment of the present invention. In FIG. 3D, instead of showing the actual tag content in tagging windows (as shown in FIG. 3C), five tag symbols (381_1, 381_2, 381_3, 382, and 383) are shown in video frame 340B in the form of star symbols. It is to be understood that other visual symbols may also be used to represent the actual tags in a game video frame. In one embodiment, the actual tag content associated with a tag symbol may be displayed in the form a pop-up window, if a mouse cursor is moved on the top of the tag symbol, FIG. 4A illustrates a mini-game 410 integrated with tag content, in accordance with one embodiment of the present invention. In this example, mini-game 410 is created and posted by user U1 in a network webpage to be shared with his or her friends. The network webpage may be a game network webpage or a social network webpage, and user U1's friends may be his or her game network friends or social network friends, who may view and play the shared mini-game 410 and enter mini-game tag data for mini-game 410, without actually owning the game title for the original game.

As shown, mini-game 410 includes a mini-game beginning data 420, mini-game ending data 430, and a plurality of mini-game tag data 440 and game tag data 445. As discussed above, mini-game 410 may also include other overlay data, such as game state data. Mini-game tag data 440 may be entered by the mini-game creator U1, U1's social network friends (U2, U3, and U4), and U1's game network friends (U5, U6, and U7), during a view of mini-game 410. Game tag data 445 may be entered by the mini-game creator U1 during a play for the original game title or during a view of the video recording of the game play.

Figure 4B:
FIG. 4B shows a mini-game data table associated with a mini-game, in accordance with one embodiment of the present invention.

FIG. 4B shows a mini-game data table 400 associated with mini-game 410, in accordance with one embodiment of the present invention. In this example, mini-game data table 400 includes six columns: the "User" column, the "Title Owned" column, the "Game Network Friends" column, the "Social Network Friends" column, the "Tag Content" column, and the "Video Frame Number" column. The "User" column lists the mini-game creator U1 (noted with a start symbol) and all of his or her social network friends (U2, U3, and U4) and game network friends (U5, U6, and U7). The "Title Owned" column indicates which user owns the original game title (T1), based on which mini-game 410 is created. The "Game Network Friends" column and the "Social Network Friends" column respectively show which users are U1's game network friends and social network friends. The "Tag Content" column shows the tag content entered by the users listed in the "User" column. In this example, users U1, U2, U5, U6, and U7 entered text comments, user U3 entered a video clip, and user U4 did not enter any tag data. The "Video Frame Number" column shows the respective video frame numbers associated with the tag content shown in the "Tag Content" column.

In one embodiment, the tag content in the "Tag Content" column may be shown in different colors (not shown) to distinguish the game tag data and mini-game tag data. Alternatively, other methods may also be used to distinguish the game tag data and mini-game tag data in mini-game data table 400.

Figure 5:
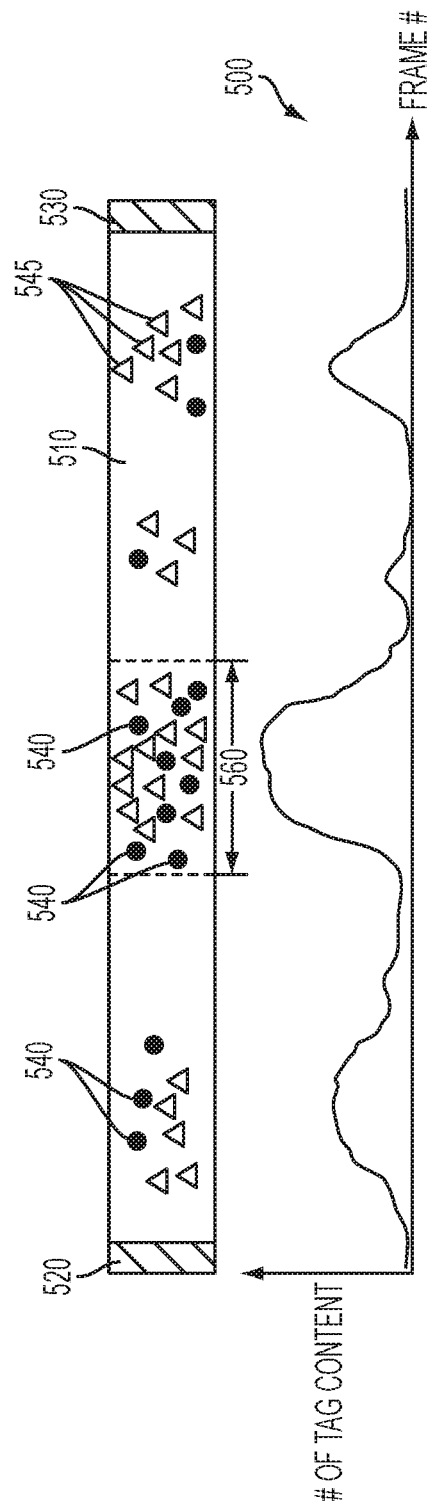
FIG. 5 illustrates a histogram generated based on the tag content in a mini-game, in accordance with one embodiment of the present invention.

FIG. 5 illustrates a histogram 500 generated based on the tag content in a mini-game 510, in accordance with one embodiment of the present invention. Mini-game 510, which is a shared mini-game in a game cloud system, includes mini-game beginning data 520, mini-game ending data 530, tag content (represented by the triangle and solid dot symbols), and other metadata related to mini-game 510 (not shown). The tag content includes game tag data 540 (represented by the solid dot circles) and mini-game tag data 545 (represented by the triangle symbols). Game tag data 540 is entered by the creator of mini-game 510 while he or she is playing the game for the original game title based on which mini-game 510 is created, or during a view of the video recording of the game play. Mini-game tag data 545 is entered while mini-game 510 is viewed by either the mini-game creator or other users who have access to the shared mini-game 510. In one embodiment, the other users are the social network friends of the mini-game creator. Alternatively, the other users are the game network friends of the mini-game creator.

Histogram 500 is plotted based on the quantities of tag content and the associated video frames of mini-game 510. Histogram 500 can help game developers to identify which section of mini-game 510 has the most tag content, and/or identify which video frame of mini-game 510 has the most tag content. Thus, based on user activity, e.g., tagging for a mini-game, game developers can analyze the history of tagging and the tag content for a shared mini-game. For example, if all or majority of tag content in section 560 of mini-game 510 is positive, section 560 of mini-game 510 is a popular section. Based on this information, game developers can make new games that contain theme or actions similar to the ones in section 560 of mini-game 510. Further, game developers can also identify a popular video frame if the video frame has the most positive content tag in a shared mini-game.

In one embodiment, mini-games stored in a game cloud system, e.g., game cloud system 110, may be ranked, e.g., by mini-game processor 172, based on the tag content in the mini-games. For example, the mini-game with the more positive tag content can have the highest ranking among those mini-games stored in game cloud system 110. In another embodiment, a mini-game video frame with the most tag content can be identified, e.g., by mini-game processor 172, as the representative frame for the mini-game. In addition to just providing information that particular frames were tagged, additional data can be provided by the tagging entity, such as a rating (e.g., number of starts, positive points, rank, feedback, etc.).

Figure 6A:
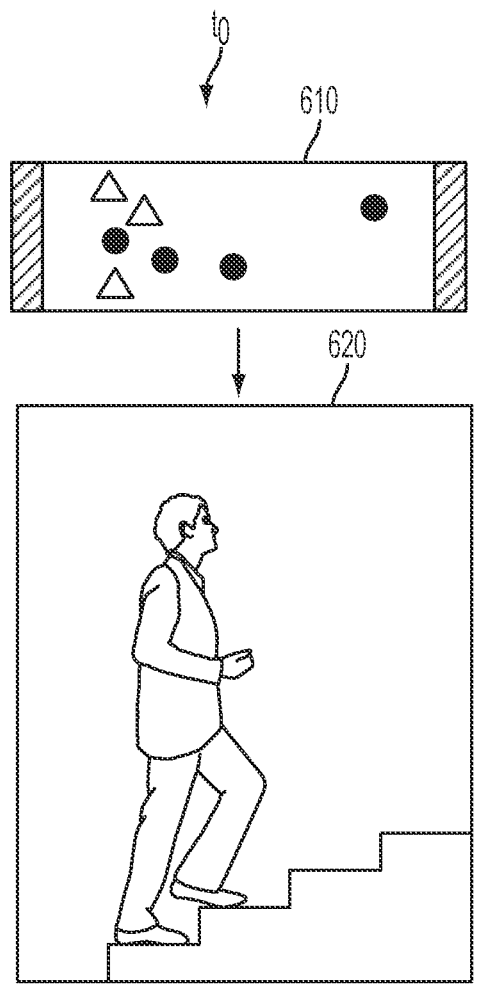
FIGS. 6A and 6B illustrate the dynamic changes for the mini-game representative frames based on tag content of a shared mini-game in a cloud, in accordance with one embodiment of the present invention.
Figure 6B:
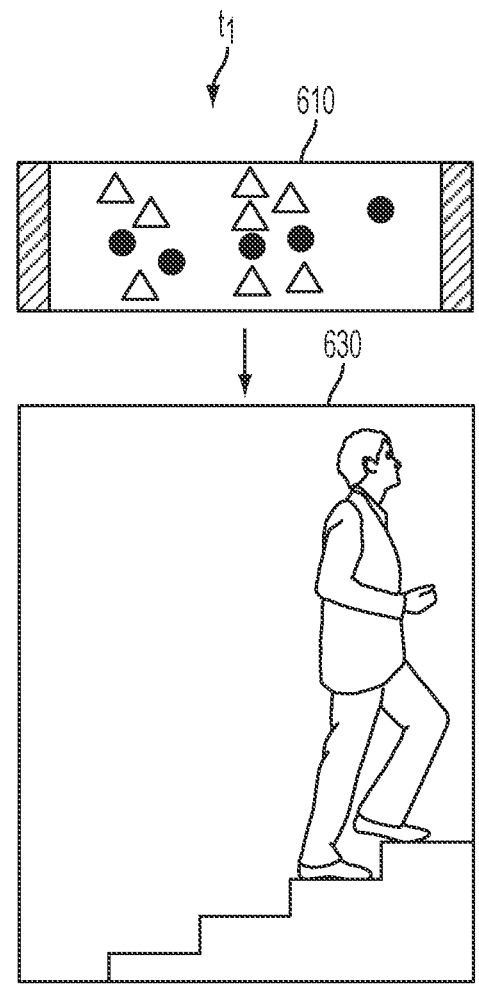

FIGS. 6A and 6B illustrate the dynamic changes for the mini-game representative frames based on tag content of a shared mini-game in a game cloud system, in accordance with one embodiment of the present invention. As shown in FIG. 6A, the representative frame for mini-game 610 at time t0 is video frame 620 that contains the most tag content at time t0. As time goes by, more tag content is entered for mini-game 610. At time t1, the representative frame for mini-game 610 is video frame 630 that contains the most tag content. The image of the representative frame for mini-game 610 may be displayed as the icon image. Alternatively, the image of the representative frame may be displayed as a mouse cursor is moved on top of the icon that represents mini-game 610, or an input is detected (e.g., touch on a touch screen, gesture, voice, etc.).

Figure 7:
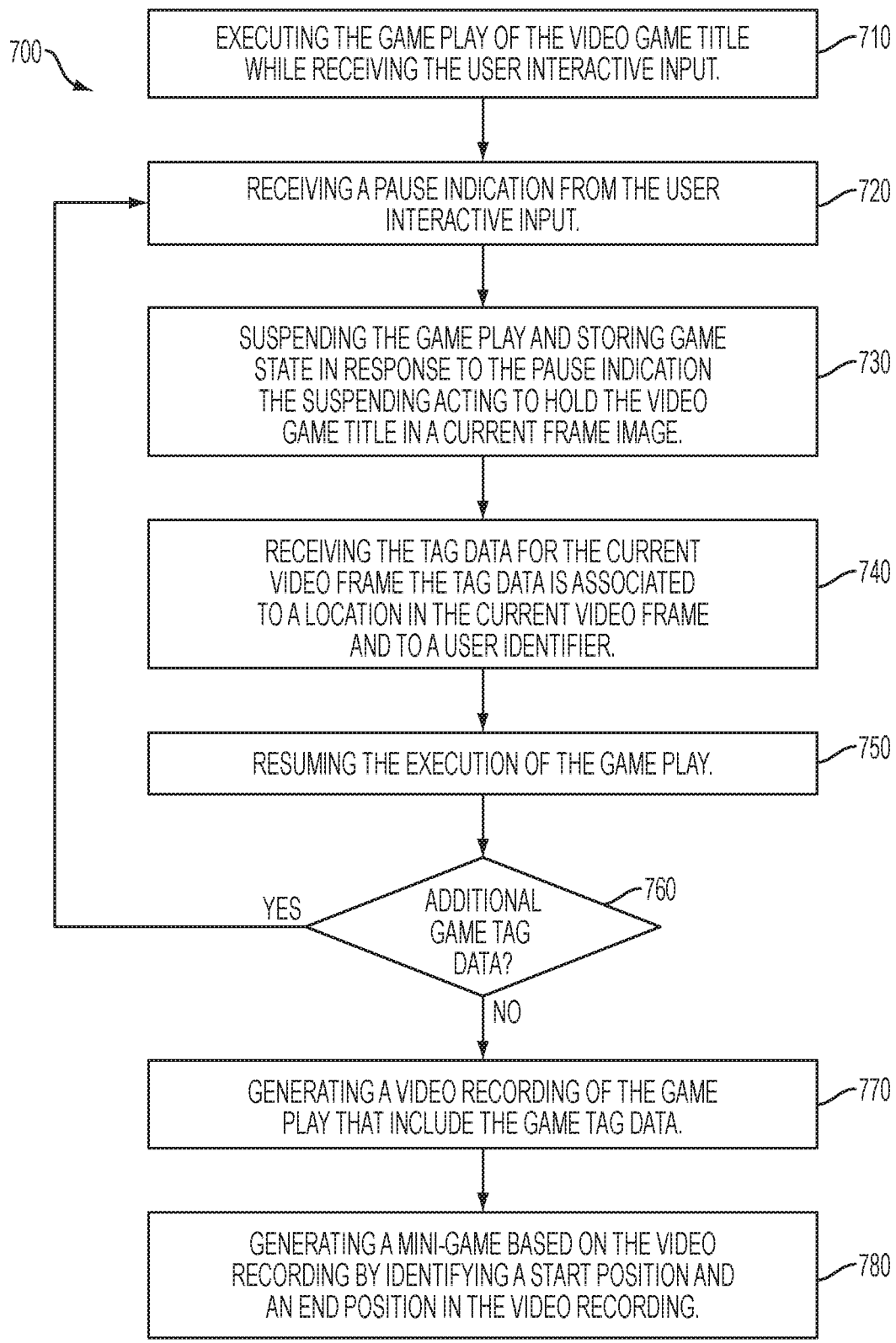
FIG. 7 is a flow chart illustrating an exemplary method for tagging content in a video game title during a game play executed on a game cloud system, in accordance with one embodiment of the present invention.

FIG. 7 is a flow chart illustrating an exemplary method 700 for tagging content in a video game title during a game play executed on a game cloud system, in accordance with one embodiment of the present invention. In one embodiment, the illustrated exemplary method 700 is described in relation to operations performed by game cloud system 110 as shown in FIG. 1A. Again, the system of FIG. 1A is only an example, and variations to the system components can exist so long as the desired functionality is processed.

At operation 710, a game play is executed for a video game title by a user (or game player) and a user interactive input may be received from the user during the execution of the game play. In one embodiment, the game code of the video game title is stored in game code store 161 of game cloud system 110 and the game is executed by game execution engine 170 of game cloud system 110. The video frames 135 of the executed game play is transmitted by game execution engine 170 via game session manager 185 and network interface 190 to user device 130 to be displayed. The user interactive input, e.g., input 136, may be received from user device 130 by game session manager 185. In one embodiment, the user interactive input is a control signal indicating the beginning of a tagging process. For example, the user may check a "Tagging" check box on the display screen to initiate the tagging process.

At operation 720, a pause indication from the user interactive input is received. For example, after the user clicks or selects a tagging button on the display screen of user device 130, game session manger 185 may send a pause indication to game execution engine 170 to suspend the execution of the game play. In one embodiment, the pause indication is sent by the user when he or she sees a particular video frame in which he or she would like to enter game tag data at a chosen location.

At operation 730, the game play is suspended and the game state of the game play is stored, in response to the pause indication. The suspension results in a video frame that is current on display in the display screen of user device 130 to be on hold on the display screen.

At operation 740, tag data is received for the current video frame, the tag data is associated to a location in the current video frame and to a user identifier (UID) of the user. In one embodiment, the tag data entered by the user is received by game session manager 185 from user device 130 (or any connected device, whether wired or wireless), and game session manager 185 may inform tag processor 173 that in turn saves the tag data in tag data store 163. Game session manager 185 may also inform user processor 174 so that the "User Tags" field in the user profile associated with the user may get updated. In one embodiment, the user may choose a location in the current video frame for tagging by moving a mouse cursor to the desired location. After the mouse is double clicked (or selection is made by some input mechanism), a tagging window may pop up so that the user can enter game tag data into the tagging window. In one embodiment, game tag data may be text messages, images, video clips, etc.

At operation 750, the execution of the game play is resumed. In one embodiment, the user may uncheck the "Tagging" check box on the display screen of the user device to resume the execution.

At operation 760, whether there is any additional game tag data that needs to be entered will be determined. In one embodiment, a user may check the "Tagging" check box in the display screen to re-initiate the input for additional game tag data. If there is additional game tag data, the operations 720, 730, 740, and 750 will be repeated. If there is no additional tag data, a video recording of the game play will be generated at operation 770, and the video recording of the game play includes the tag data entered by the user.

At operation 780, a mini-game is generated or created from a portion of the video recording. The mini-game may be generated by identifying a start position and an end position in the video recording. For example, a user may create a mini-game while he or she is viewing the video recording of the game play on a screen. When a desired beginning video frame appears on the screen, the user may check a mini-game creation check box in a control panel to identify this video frame as the start position of the mini-game and uncheck the mini-game creation check box to identify a video frame as the end position of the mini-game. As such, the video recording of the mini-game, which is a portion of the video recording of the game play, includes the game tag data associated with the video frames in the mini-game video recording.

The mini-game includes a playable portion to enable view of a portion of the video recording for the mini-game and an executable portion to enable play of game code for the mini-game that is a portion of the video game title. When the shared mini-game is viewed in the cloud, mini-game tag data can be entered. Similar the method described above for tagging content in the video game title during the game play of the original full game version, mini-game tag data entry may be started by pausing the view of the mini-game on a display and enabling a location on the display for tagging. After receiving the mini-game tag data at the enabled location, the mini-game tag data is integrated with or associated to the game code of the mini-game. Then, the view of the mini-game can be resumed. The above described mini-game tag data entry method can be repeated for additional mini-game tag data. Finally, a mini-game video frame with most tag content is identified to be the representative frame for the mini-game. The tag content includes game tag data and mini-game tag data associated with the identified mini-game video frame.

In one embodiment, the cloud gaming system is configured to detect the type of client device associated with the user, and also a type of controller available for the user to provide input to the cloud-based video game. For example, in one embodiment, when a user logs in to the cloud gaming system, they may be presented with an option to designate the type of client device with which they are accessing the cloud gaming system. In one embodiment, a series of client device options are presented from which the user may select one corresponding to their client device. The user may also be presented with an option to designate the type of controller device they will use to play a video game. In one embodiment, a series of controller options can be presented to the user, from which the user may select to designate a controller type corresponding to their controller hardware. In other embodiments, the cloud gaming system can be configured to automatically detect the client device type and/or the controller device type.

For example, at the time of login, the client device may send information to the cloud gaming server identifying itself as well as a connected controller device (e.g. in response to a request from the cloud gaming server). Based on this information, the cloud gaming server may determine an appropriate video game output configuration and input parameter configuration to provide a gaming experience optimized for the user's client device and controller device. In one embodiment, a look-up table is employed to determine video game configuration and input parameter configuration based on a detected client device and a detected controller device.

It should be appreciated that a given video game may be developed for a specific platform and a specific associated controller device. However, when such a game is made available via a cloud gaming system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlayed during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud gaming server via a network (e.g. accessed via a local networking device such as a router). However, in other embodiments, the controller can itself be a networked device, with the ability to communicate inputs directly via the network to the cloud gaming server, without being required to communicate such inputs through the client device first. For example, the controller might connect to a local networking device (such as the aforementioned router) to send to and receive data from the cloud gaming server. Thus, while the client device may still be required to receive video output from the cloud-based video game and render it on a local display, input latency can be reduced by allowing the controller to send inputs directly over the network to the cloud gaming server, bypassing the client device.

In one embodiment, a networked controller and client device can be configured to send certain types of inputs directly from the controller to the cloud gaming server, and other types of inputs via the client device. For example, inputs whose detection does not depend on any additional hardware or processing apart from the controller itself can be sent directly from the controller to the cloud gaming server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud gaming server. These might include captured video or audio from the game environment that may be processed by the client device before sending to the cloud gaming server. Additionally, inputs from motion detection hardware of the controller might be processed by the client device in conjunction with captured video to detect the position and motion of the controller, which would subsequently be communicated by the client device to the cloud gaming server. It should be appreciated that the controller device in accordance with various embodiments may also receive data (e.g. feedback data) from the client device or directly from the cloud gaming server.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method, comprising:
   receiving at a server a plurality of tag data for a video game recording of a game play by a user playing a video game, wherein the plurality of tag data originates from a plurality of viewers viewing the video game recording;
   identifying at the server a viewable portion of the video game recording having a concentration of the plurality of tag data;
   generating at the server a subset of the video game recording based on the viewable portion of the video game recording; and
   providing to a viewer of the subset of the video game recording a playable portion of the video game recording corresponding to the viewable portion,
   wherein the playable portion of the video game recording enables a new game play of the video game for the viewable portion beginning at a first point in the game play of the user that corresponds with a start position of the viewable portion,
   wherein the playable portion of the video game recording is executed independent of the game play by the user at the server using game code for the video game and state data associated with the first point in the game play of the user.

2. The method of claim 1, further comprising:
   accessing the game code for the video game corresponding to the viewable portion of the video game recording for executing the playable portion.

3. The method of claim 1, further comprising:
   identifying one or more viewable portions of the video game recording having tag data; and
   determining quantities of tag data associated with each of the one or more viewable portions that is identified.

4. The method of claim 1, wherein the receiving at the server the plurality of tag data includes:
   receiving one or more items of tag data from the user playing the video game.

5. The method of claim 1, wherein the receiving at the server the plurality of tag data includes:
   receiving one or more items of tag data from one or more of the plurality of viewers viewing the video game recording.

6. The method of claim 1, further comprising:
   posting the playable portion of the video game recording to a web page of a social group for viewing and playing by users of the social group,
   wherein the social group is one of a first game sharing website, a social network, or a second game sharing website having social networking information regarding sharing, posting, or comments regarding the viewable portion of the video game recording.

7. The method of claim 6, further comprising:
   posting the playable portion of the video game recording as a uniform resource locator (URL).

8. The method of claim 1, further comprising:
   providing to the viewer of the video game recording the playable portion of the video game recording corresponding to the viewable portion.

9. A method, comprising:
   providing a game slice defined from a recorded game play of a video game by a first user, the game slice including a viewable portion of the recorded game play and a playable portion of the recorded game play;
   receiving at a server a plurality of tag data for the viewable portion of the recorded game play, wherein the plurality of tag data originates from a plurality of viewers viewing the viewable portion of the recorded game play;
   identifying at the server a sub-portion of the viewable portion of the recorded game play having a concentration of the plurality of tag data;

generating at the server a subset of the viewable portion of the recorded game play based on the sub-portion of the viewable portion of the recorded game play; and providing to a viewer of the subset of the viewable portion of the recorded game play a playable sub-portion of the game slice corresponding to the sub-portion of the viewable portion of the recorded game play, wherein the playable sub-portion of the game slice enables a new game play of the video game for the sub-portion of the viewable portion of the recorded game play beginning at a first point in a game play of the first user that corresponds with a start position of the sub-portion of the viewable portion of the recorded game play, wherein the playable sub-portion of the game slice is executed independent of the game play by the first user at the server using game code for the video game and state data associated with the first point in the game play of the first user.

10. The method of claim 9, further comprising:
accessing the game code for the video game corresponding to the sub-portion of the viewable portion of the recorded game play for executing the playable sub-portion of the game slice.

11. The method of claim 9, further comprising:
identifying one or more sub-portions of the viewable portion of the recorded game play; and
determining quantities of tag data associated with each of the one or more sub-portions that is identified.

12. The method of claim 9, wherein the receiving at the server the plurality of tag data includes:
receiving one or more items of tag data from a second user playing the playable portion of the recorded game play.

13. The method of claim 9, wherein the receiving at the server the plurality of tag data includes:
receiving one or more items of tag data from a plurality of viewers viewing the viewable portion of the recorded game play.

14. The method of claim 9, further comprising:
posting the playable sub-portion of the game slice to a web page of a social group for viewing and playing by users of the social group,
wherein the social group is one of a first game sharing website, a social network, or a second game sharing website having social networking information regarding sharing, posting, or comments regarding the viewable portion of the video game recording.

15. The method of claim 14, further comprising:
posting the playable sub-portion of the game slice as a uniform resource locator (URL).

16. The method of claim 9, further comprising:
identifying a video frame of the viewable portion of the recorded game play having a highest number of tag data; and
selecting the video frame that is identified as a representative frame for the playable sub-portion of the game slice.

17. The method of claim 9, further comprising:
providing to the viewer of the viewable portion of the recorded game play the playable sub-portion of the game slice.

18. A non-transitory computer readable medium having program instructions for a method, the computer readable medium comprising:

program instructions for receiving at a server a plurality of tag data for a video game recording of a game play by a user playing a video game, wherein the plurality of tag data originates from a plurality of viewers viewing the video game recording;

program instructions for identifying at the server a viewable portion of the video game recording having a concentration of the plurality of tag data;

program instructions for generating at the server a subset of the video game recording based on the viewable portion of the video game recording; and program instructions for providing to a viewer of the subset of the video game recording a playable portion of the video game recording corresponding to the viewable portion, wherein the playable portion of the video game recording enables a new game play of the video game for the viewable portion beginning at a first point in the game play of the user that corresponds with a start position of the viewable portion, wherein the playable portion of the video game recording is executed independent of the game play by the user at the server using game code for the video game and state data associated with the first point in the game play of the user.

19. The non-transitory computer readable medium of claim 18, further comprising:
program instructions for accessing the game code for the video game corresponding to the viewable portion of the video game recording for executing the playable portion.

20. The non-transitory computer readable medium of claim 18, wherein the program instructions for receiving at the server the plurality of tag data includes:
program instructions for receiving one or more items of tag data from the user playing the video game; and
program instructions for receiving one or more items of tag data from one or more of the plurality of viewers viewing the video game recording.

21. The non-transitory computer readable medium of claim 18, further comprising:
program instructions for posting the playable portion of the video game recording to a web page of a social group for viewing and playing by users of the social group,
wherein the social group is one of a first game sharing website, a social network, or a second game sharing website having social networking information regarding sharing, posting, or comments regarding the viewable portion of the video game recording.

22. The non-transitory computer readable medium of claim 21, further comprising:
program instructions for posting the playable portion of the video game recording as a uniform resource locator (URL).

23. The non-transitory computer readable medium of claim 18, further comprising:
program instructions for providing to the viewer of the video game recording the playable portion of the video game recording corresponding to the viewable portion.

* * * * *